US011366868B1

(12) United States Patent
Birch et al.

(10) Patent No.: US 11,366,868 B1
(45) Date of Patent: Jun. 21, 2022

(54) NOTIFICATION OF CHANGE OF VALUE IN STALE CONTENT

(71) Applicant: GOOGLE LLC, Mountain View, CA (US)

(72) Inventors: Samuel Birch, Seattle, WA (US); Yusuf Ozuysal, Palo Alto, CA (US); Ayman Almadhoun, Seattle, WA (US); Armina Foroughi, San Francisco, CA (US); David Maunder, Seattle, WA (US); Matthew Simmons, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/249,763

(22) Filed: Mar. 11, 2021

(51) Int. Cl.
*G06F 16/957* (2019.01)
*H04L 67/5682* (2022.01)
*G06F 16/955* (2019.01)

(52) U.S. Cl.
CPC ........ *G06F 16/957* (2019.01); *G06F 16/9566* (2019.01); *H04L 67/2852* (2013.01)

(58) Field of Classification Search
CPC .... G06F 16/9566; G06F 16/957; G06F 16/00; G06F 12/0842; G06F 3/0481; G06F 3/0484; G06F 3/04883; G06F 30/00; G06F 8/34; G06F 9/451; G06F 9/54; H04L 67/2852; H04L 41/20; G06Q 30/0251; G06T 11/60
See application file for complete search history.

(56) References Cited

U.S. PATENT DOCUMENTS

| | | | |
|---|---|---|---|
| 2007/0073593 A1 | 3/2007 | Perry et al. | |
| 2011/0179364 A1* | 7/2011 | Morris | G06F 3/0482 715/764 |
| 2011/0213655 A1* | 9/2011 | Henkin | G06Q 30/00 707/E17.061 |
| 2014/0279214 A1 | 9/2014 | Wagoner-Edwards et al. | |
| 2016/0253409 A1* | 9/2016 | Pappas | G06F 16/287 707/738 |
| 2017/0017634 A1* | 1/2017 | Levine | G06F 3/04847 |
| 2017/0116135 A1* | 4/2017 | Sundaravaradan | G06F 16/9574 |
| 2017/0243247 A1 | 8/2017 | Mathew et al. | |
| 2017/0329614 A1* | 11/2017 | Schon | G06F 3/04845 |

(Continued)

OTHER PUBLICATIONS

"Price Tracker / Otsledit", Otsledit, Chrome Web Store (https://chrome.google.com/webstore/detail/price-tracker-otsledit/ibamclpibpnhmkaphhemfbljmenlpbch), Oct. 30, 2020, 13 pages.

(Continued)

*Primary Examiner* — Le H Luu
(74) *Attorney, Agent, or Firm* — Brake Hughes Bellermann LLP

(57) ABSTRACT

A method can include determining that a tab is stale, determining a first universal resource locator (URL) associated with the tab, determining that content presented by the stale tab corresponds to an object that is also presented by content associated with a second URL, determining, based on content associated with at least one of the first URL or the second URL, that a value of an attribute associated with the object has changed from the value of the attribute when the tab presented the object, and outputting a notification that the value of the attribute associated with the object has changed.

20 Claims, 18 Drawing Sheets

(56) References Cited

U.S. PATENT DOCUMENTS

| | | | | |
|---|---|---|---|---|
| 2018/0365030 | A1* | 12/2018 | Standley | G06F 9/445 |
| 2020/0044926 | A1* | 2/2020 | Lui | H04L 67/10 |
| 2020/0349486 | A1* | 11/2020 | Moolman | G06Q 10/06313 |
| 2020/0356350 | A1* | 11/2020 | Penland | G06F 8/34 |
| 2020/0364286 | A1* | 11/2020 | Vaidya | G06F 8/65 |
| 2021/0191607 | A1* | 6/2021 | Sefton | G06F 3/04845 |

OTHER PUBLICATIONS

"Pricescount Price Comparison", Chrome Web Store (https://chrome.google.com/webstore/detail/pricescout-price-comparis/gbkjddnnlgmahpnijkiolhoophlpibfn);, Oct. 30, 2020, 5 pages.

"Protect Your Browsing with Web of Trust", WOT, Chrome Web Store (https://chrome.google.com/webstore/detail/wot-web-of-trust-website/bhmmomiinigofkjcapegjjndpbikblnp), Oct. 30, 2020, 9 pages.

"Price Tabs—Amazon, eBay, Price Comparison", Teamextension.com, Chrome Web Store (https://chrome.google.com/webstore/detail/price-tabs-amazon-ebay-pr/ojhbpfjdbcmlkmpcanm-machdgikeomoi), Oct. 30, 2020, 4 pages.

\* cited by examiner

US 11,366,868 B1

NOTIFICATION OF CHANGE OF VALUE IN STALE CONTENT

BACKGROUND

Objects can have values that are monitored by multiple sources. It can be difficult to keep track of all of the sources.

SUMMARY

According to an example, a method can include determining that a tab is stale, determining a first universal resource locator (URL) associated with the tab, determining that content presented by the stale tab corresponds to an object that is also presented by content associated with a second URL, determining, based on content associated with at least one of the first URL or the second URL, that a value of an attribute associated with the object has changed from the value of the attribute when the tab presented the object, and outputting a notification that the value of the attribute associated with the object has changed.

A method can include determining that a tab is stale, determining that a value of an attribute associated with an object presented by the tab has changed, and outputting a notification that the value of the attribute associated with the object has changed. The determining that the tab is stale can include determining that the tab has been open for at least an open threshold time, and determining that the tab has not received input for at least an input threshold time.

A non-transitory computer-readable storage medium comprising instructions stored thereon. When executed by at least one processor, the instructions can be configured to cause a server to determine that a tab is stale, determine a first universal resource locator (URL) associated with the tab, determine that content presented by the stale tab corresponds to an object that is also presented by content associated with a second URL, determine, based on content associated with at least one of the first URL or the second URL, that a value of an attribute associated with the object has changed from the value of the attribute when the tab presented the object, and output a notification that the value of the attribute associated with the object has changed.

A computing system can include at least one processor, and a non-transitory computer-readable storage medium comprising instructions stored thereon. When executed by at least one processor, the instructions can be configured to cause the computing system to determine that a tab is stale, determine a first universal resource locator (URL) associated with the tab, determine that content presented by the stale tab corresponds to an object that is also presented by content associated with a second URL, determine, based on content associated with at least one of the first URL or the second URL, that a value of an attribute associated with the object has changed from the value of the attribute when the tab presented the object, and output a notification that the value of the attribute associated with the object has changed.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Users can, via web browsers executing on computing devices, check various websites for values of attributes of objects. The values of attributes of objects can include, for example, charge levels of batteries, inventory levels of products, scores of sports games, or prices of products that users are interested in. Technical problems with checking websites for the values is that there may be many websites to check from a single computing device, the values may be available on some websites that the user is not aware of, and changes to the values can occur when the user does not happen to be checking the websites. Also, multiple users may be checking websites for the same values, duplicating effort.

A technical solution to this technical problem is for a server in communication with the browsers to determine the objects that the users are interested in, monitor the values of attributes of the objects, and, when the values change, send notifications of the changed values to the browsers. This technical solution can provide the technical benefit of providing updated and/or recent values to the users, while reducing computing resources that the computing devices spend requesting information about the products from various websites. A technical benefit of this technical solution is reduced browsing, and therefore reduced load on computing resources, by the computing devices on which the browsers are executing, and faster access by the users to the updated values, allowing the users to act on the information sooner, such as by recharging batteries, refilling inventory, or purchasing products after prices have dropped.

In addition, a user's interest in continued monitoring of, and notification of changes in, a value of an object can be inferred by certain user actions, or inactions, with respect to a browser tab in which the object and its value are displayed. For example, a user's interest in having such monitoring performed and in receiving such notifications can be inferred by determining that the user has opened a browser tab in which an object having value or attribute is displayed and then allowing the tab to become stale (e.g., by the tab remaining open in a browser process but with the user not interacting the tab or with the tab being opened only in a background, non-front-facing state). The tab being stale, but not closed, may indicate that the user is interested in the content of the tab, and especially in any changes to values of an object displayed in the tab, but may have forgotten to actively monitor the tab for any changes.

Figure 1:
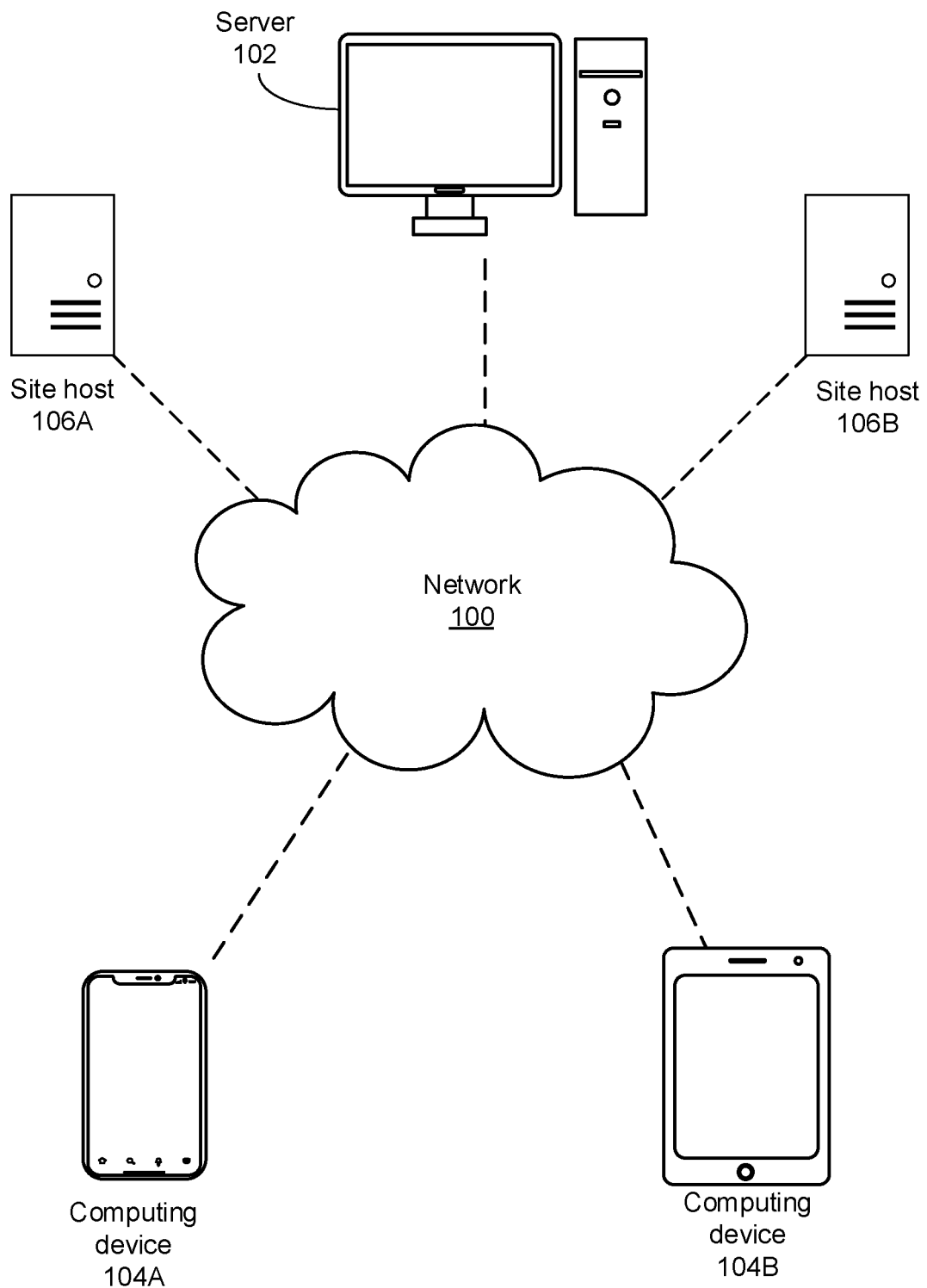
FIG. 1 is a network diagram showing a server in communication with computing devices according to an example implementation.

FIG. 1 is a network diagram showing a server 102 in communication with computing devices 104A, 104B according to an example implementation. The server 102 can include a server that communicates with computing devices, such as the computing devices 104A, 104B, that are executing web browsers, via a network 100. The network 100 can include a system and/or network for enabling different computing devices (including servers) to communicate with each other, such as the Internet. The server 102 can also communicate with other servers that host websites visited by the computing devices 104A, 104B.

The computing devices 104A, 104B can include personal computing devices accessed by a single user, or by different users. The computing devices 104A, 104B can include any computing device with a web browser, such as a smartphone, a tablet computing device, a laptop or notebook computing device, a phablet, a netbook, or a desktop computer, as non-limiting examples. The computing devices 104A, 104B can be different devices that a same user accesses to visit websites at different times, or devices that different users access to visit websites. The computing devices 104A, 104B can visit websites by communicating with servers that host the websites, such as by sending requests such as GET requests and/or performing GET methods according to Hypertext Transfer Protocol (HTTP), to the servers hosting the websites. The requests such as GET requests and/or GET methods can identify universal resource locators (URLs) associated with the websites. The computing devices 104A, 104B can communicate with the servers via the network 100.

The computing devices 104A, 104B and server 102 can communicate with site hosts 106A, 106B. The site hosts 106A, 106B can host websites identified by URLs, and can provide content, such as webpages, to the computing devices 104A, 104B in response to requests such as GET requests from the computing devices 104A, 104B. The site hosts 106A, 106B can also provide content, such as webpages, to the server 102 in response to requests from the server 102.

Figure 2A:
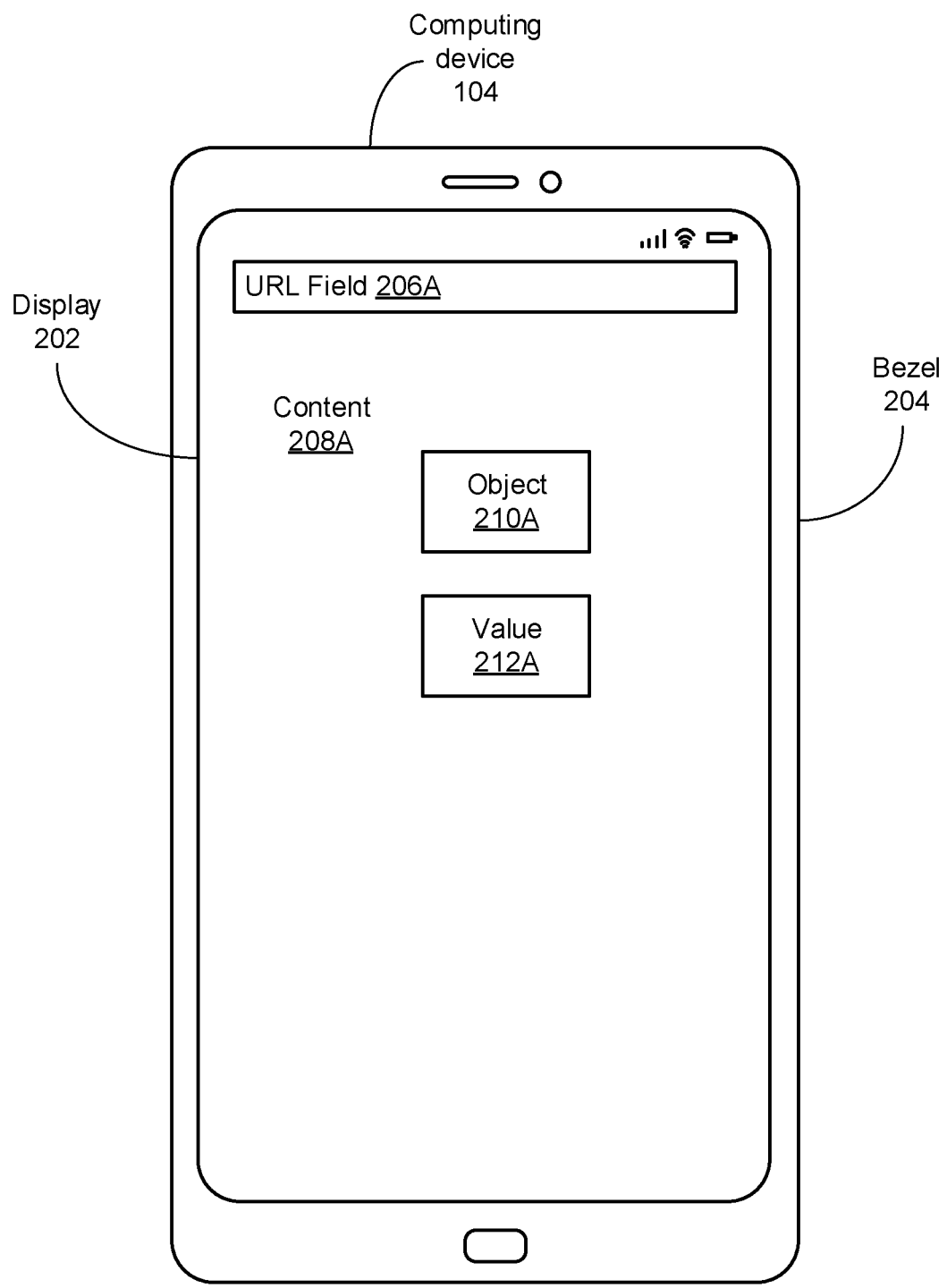
FIG. 2A shows a computing device with a browser presenting a single tab according to an example implementation.

FIG. 2A shows a computing device 104 with a browser presenting a single tab according to an example implementation. The computing device 104 can represent either of the computing devices 104A, 104B shown and described with respect to FIG. 1.

The computing device 104 can include a display 202 surrounded by a bezel 204. The bezel 204 can include a rigid material such as metal or plastic that supports and protects the display 202. The display 202 can present graphical output, such as images and/or text. When a browser is executing on the computing device 104, the images and/or text can be based on pages and/or files received from a server hosting a website visited by the browser.

The display 202 can present content 208A. The content 208A can include text and/or images. In this example, the content 208A included in the web browser can include a URL field 206A, an object 210A, and a value 212A of an attribute of the object 210A. The URL field 206A can show a universal resource locator (URL) of a website and/or webpage being rendered by the browser and/or presented by the display 202. The URL field 206A can also receive a URL as input from a user and can respond to the inputted URL by requesting a webpage from a server identified by the URL, such as by performing a GET method according to HTTP. In some examples, the display 202 can also receive input, such as touch input in examples in which the display 202 includes a touchscreen.

The content 208A presented by the browser and/or display 202 can include an object 210A. While this description describes the content 208A and tabs as being presented by a browser, the content 208A and tabs can be presented by other applications, such as applications that present values of objects being followed and/or tracked by a user. The object 210A can include and/or represent, for example, a battery, an inventory item, a sports game, or a product for sale. The content 208A presented by the browser and/or display 202 can include a value 212A of an attribute of the object 210A. The value 212A can include, for example, a charge level of the battery, a quantity of the inventory item, one or more scores in the sports game, weather in a specified location, or a price of the product for sale.

Figure 2B:
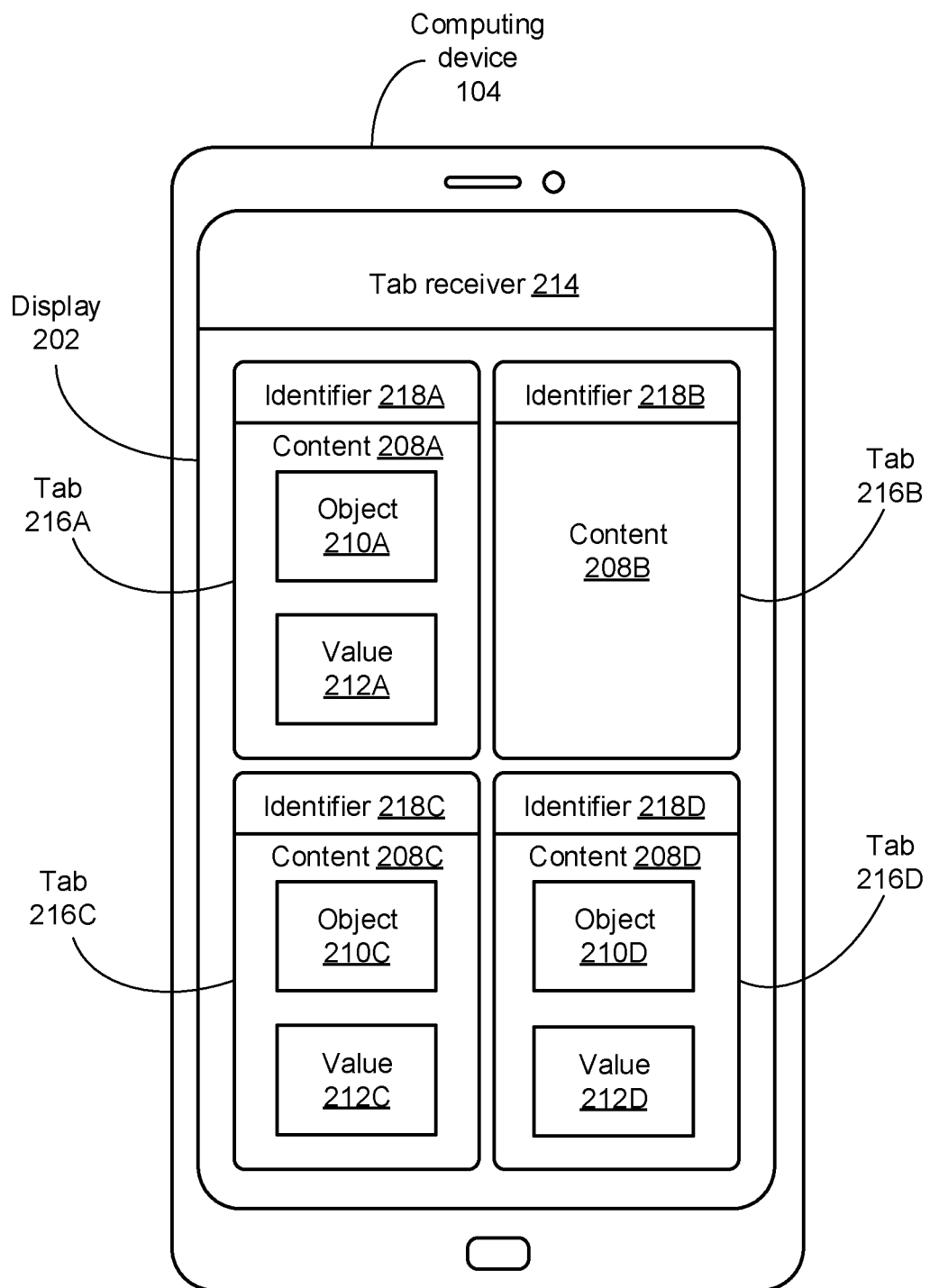
FIG. 2B shows a computing device with a browser presenting multiple tabs according to an example implementation.

FIG. 2B shows the computing device 104 with the browser presenting multiple tabs 216A, 216B, 216C, 216D according to an example implementation. This is one example of the browser presenting multiple tabs, and the browser can present multiple tabs by different techniques in other examples, such as presenting tabs other than a tab for which the content is presented at a top portion of the browser. The computing device 104 can be a same computing device as shown and described with respect to FIG. 2A.

The tabs 216A, 216B, 216C, 216D can be graphical control elements that allow multiple panels to be contained within a single window and/or browser. Each tab 216A, 216B, 216C, 216D can be associated with a single panel, which can present a webpage and/or be associated with a single URL. The user can select, such as by clicking or tapping on, a tab 216A, 216B, 216C, 216D, and the browser can respond to the selection by presenting the webpage associated with the selected tab 216A, 216B, 216C, 216D. The tabs 216A, 216B, 216C, 216D enable the browser to maintain multiple webpages within a single, and/or only one, instance of the browser.

The browser and/or display 202 can present the multiple tabs 216A, 216B, 216C, 216D in response to user input instructing the browser to open an additional tab(s). In some examples, the browser can include a tab receiver 214 that responds to user input by opening an additional tab. The tab receiver 214 can include, for example, a new tab icon that the user can tap and/or click on to request the browser to open a new tab. In some examples, each tab 216A 216B, 216C, 216C can present a different webpage, enabling the user to view content 208A, 208B, 208C, 208D from different webpages.

In some examples, each tab 216A, 216B, 216C, 216D presented by the browser can include an identifier 218A, 218B, 218C, 218D and content 208A, 208B, 208C, 208D. The identifier 218A, 218B, 218C, 218D can identify and/or describe the website and/or webpage from which the content 208A, 208B, 208C, 208D is rendered. The identifier 218A, 218B, 218C, 218D can include a URL identifying the website and/or webpage, and/or can include a textual and/or graphical description of the content 208A, 208B, 208C, 208D.

The content 208A of one or more of the tabs 216A, 216C, 216D can include objects 210A, 210C, 210D and values 212A, 212C, 212D of attributes associated with the objects. The objects 210A, 210C, 210D can include and/or represent, for example, a battery, an inventory item, a sports game, or a product for sale. The values 212A, 212C, 212D can include, for example, a charge level of the battery, a quantity of the inventory item, one or more scores in the sports game, or a price of the product for sale.

A user can interact with the content 208A, 208B, 208C, 208D presented by the browser in the example of a single tab shown in FIG. 2A or multiple tabs shown in FIG. 2B. The user can interact with the content 208A, 208B, 208C, 208D by, for example, tapping or clicking on portions of the content 208A, 208B, 208C, 208D, or entering alphanumeric input into the portion of the browser associated with the respective tab 216A, 216B, 216C, 216D, or scrolling through the content of a tab. If the user explicitly consents to sharing browsing data to improve the user's browsing experience and/or receive notifications of changes of values such as price drops, the computing device 104 can send the server 102 browsing data, which can include which websites and/or URLs the browser visited and the user's interactions with the websites for which content is presented by the browser and/or display 202.

If a user does not interact with a tab 216A, 216B, 216C, 216D (e.g., does not scroll through content rendered in the tab and does not click on or tap any content items rendered in the tab, does not enter any values into fields included in the webpage presented by the tab, and/or does not otherwise cause a change of content rendering on the tab) for at least an input threshold time (e.g., five minutes, one hours, one day)), then the tab 216A, 216B, 216C, 216D can be considered stale. A tab 216A, 216B, 216C, 216D also can be considered stale if the tab 216A, 216B, 216C, 216D has been open in a browser process but is not displaying content 208A, 208B, 208C, 208D to a user (i.e., the tab is opened in background, or in a non-front-facing, state) for at least an input threshold time (e.g., five minutes, one hours, one day). In some examples, the server 10 can determine the input threshold time based on an average (such as a mean, median, or mode) time between changes in values for the objects presented by a webpage. In some examples, the tab 216A, 216B, 216C, 216D can be considered stale if the tab 216A, 216B, 216C, 216D has also been open in a browser process but has not been displaying content to a user for less than a forgotten threshold time (such as one week or one month). A stale tab can indicate content 208A, 208B, 208C, 208D that a user is interested in, but for which the user is no longer actively checking for updates on that particular tab 216A, 216B, 216C, 216D. The server 102 can respond to a tab 216A, 216B, 216C, 216D becoming stale by tracking a value associated with the content 208A, 208B, 208C, 208D associated with the stale tab 216A, 216B, 216C, 216D and sending one or more notifications of the value to the browser.

The server 102 can track the value associated with the content 208A, 208B, 208C, 208D, content 208A, 208B, 208C, 208D being associated with the stale tab 216A, 216B, 216C, 216D. Tracking the value can include determining a URL associated with the stale tab 216A, 216B, 216C, 216D. The server 102 can determine the URL based on the content of the URL field 206A (which can include the URL), and/or based on the content of the identifier field 218A, 218B, 218C, 218D (which can include the URL and/or an identifier that is associated with and/or maps to the URL).

Tracking the value can include determining an object 210A, 210C, 210D presented by the content 208A, 208C, 208D of the stale tab 216A, 216C, 216D. The server 102 can determine the object 210A, 210C, 210D based on an image file included in the content 208A, 208C, 208D, based on a text description of the object 210A, 210C, 210D included in the content 208A, 208C, 208D, and/or based on objects associated with websites that are associated with the URL associated with the tab 216A, 216C, 216D.

In some examples, the tracking the value can include the server 102 determining that the content 208A, 208C, 208D presented by the stale tab 216A, 216C, 216D corresponds to an object that is also presented by content associated with a second URL, and/or additional URLs. The server 102 can crawl additional websites for content that includes the corresponding object, and/or access a database that includes content from websites that include the corresponding object.

The tracking the value can include determining the value 212A, 212C, 212D of the attribute of the object 210A, 210C, 210D based on the content 208A, 208C, 208D of the stale tab 216A, 216C, 216D. In some examples, the tracking the value can also include determining the value of the attribute of the object based on content associated with the second URL and/or additional URLs. The server 102 can, for example, determine the value based on text that is proximal and/or adjacent to the image file and/or text description of the object. In some examples, the server 102 can determine the value of the attribute of the object as a lowest value or a highest value of the values determined to be associated with the multiple URLs associated with the object.

The server 102 can determine that the value of the attribute of the object 210A, 210C, 210D presented by the stale tab 216A, 216C, 216D has changed. The change can be from a value of the object 210A, 210C, 210D when the tab 216A, 216C, 216D first presented the object 210A, 210C, 210D, when the tab 216A, 216C, 216D last presented the object 210A, 210C, 210D, and/or when the tab 216A, 216C, 216D was determined to be stale. In some examples, the determination that the value of the attribute has changed can be based on content associated with at least one of the URLs associated with the object including changed text associated with the attribute and/or a changed number associated with the attribute. In some examples, the server 102 can determine that the value of the attribute of the object has changed based on a difference between the value 212A, 212C, 212D presented by the stale tab 216A, 216C, 216D and the highest or lowest value of the values determined to be associated with multiple URLs. The change can be based, for example, on the difference between the highest or lowest value of the values determined to be associated with multiple URLs and a value most-recently viewed by the user in either the stale tab 216A, 216C, 216D or another tab. In some examples, the determination that the value of the attribute has changed can be based on the difference meeting a change threshold. The change threshold can be a fraction of the original value (such as 10% or 25%) or an absolute value. The original value can be the value 212A, 212C, 212D presented by the stale tab 216A, 216C, 216D, or the lowest or highest value of the values determined to be associated with the multiple URLs associated with the object.

Based on determining that the value of the object 210A, 210C, 210D presented by the stale tab 216A, 216C, 216D has changed, the server 102 can send a notification to the browser. The notification can indicate that the value of the attribute associated with the object 210A, 210C, 210D has changed. The notification can prompt the browser to present a notification of the changed value to the user.

Figure 2C:
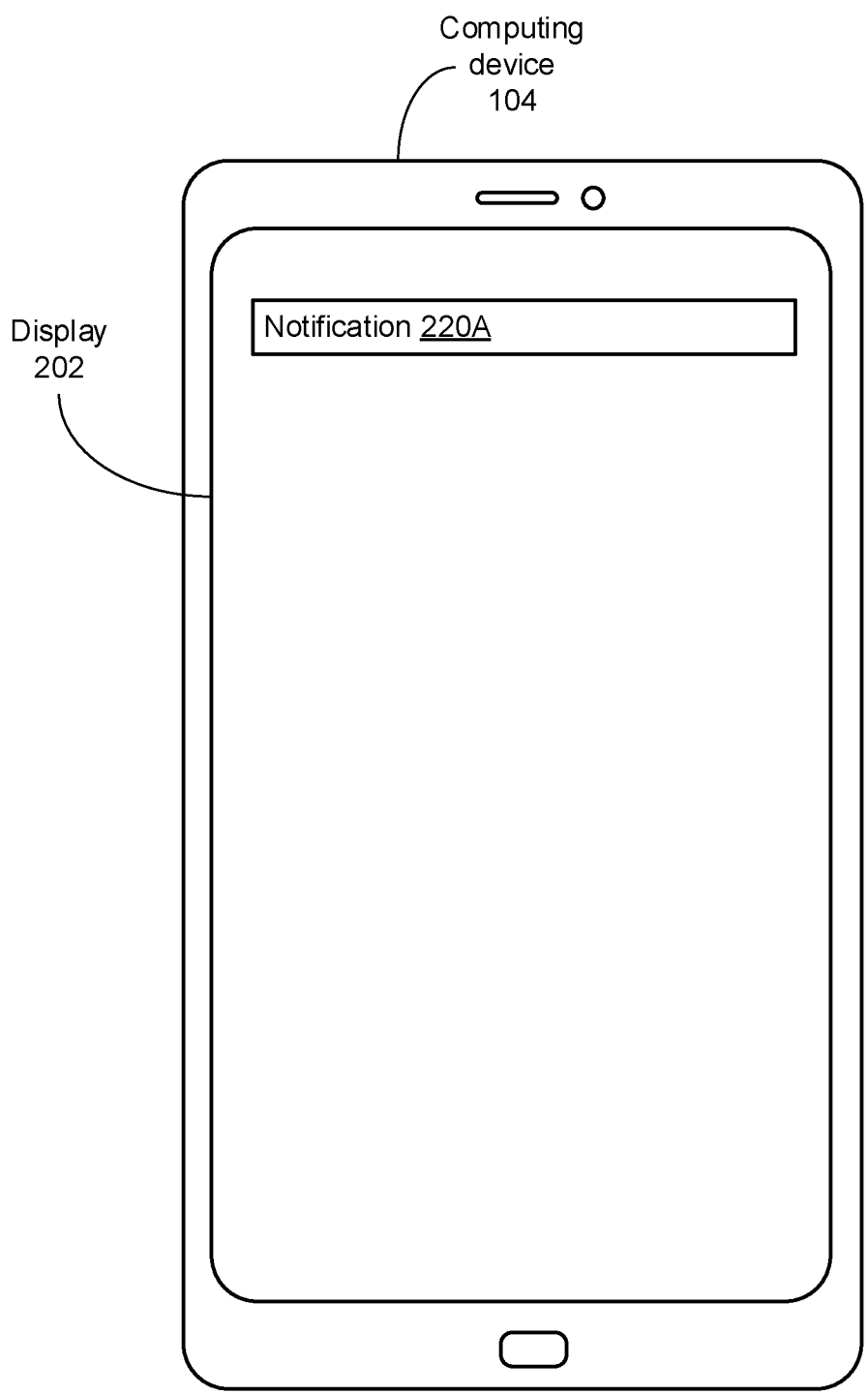
FIG. 2C shows a computing device presenting a notification according to an example implementation.

FIG. 2C shows the computing device 104 presenting a notification 220A according to an example implementation. In this example, the browser executing on the computing device 104 presents only a single tab. The computing device 104 can present the notification 220A within the browser presented by the display 202. The computing device 104 can present the notification 220A in response to receiving a notification, and/or a notification message from the server 102. The notification 220A can include a description and/or image of the object, and a value of the attribute of the object. The description and/or image of the object and value of the attribute can be based on information included in the notification and/or notification message received from the server 102. In some examples, the notification 220A can also include a description of the change to the value of the attribute of the object, such as a statement that the value has dropped and/or been reduced. In some examples, the computing device 104 can present the notification 220A within the browser even when multiple tabs are open on the browser and the tab that the browser is presenting to the user is not related to the object for which the computing device 104 and/or server 102 is tracking the value.

Figure 2D:
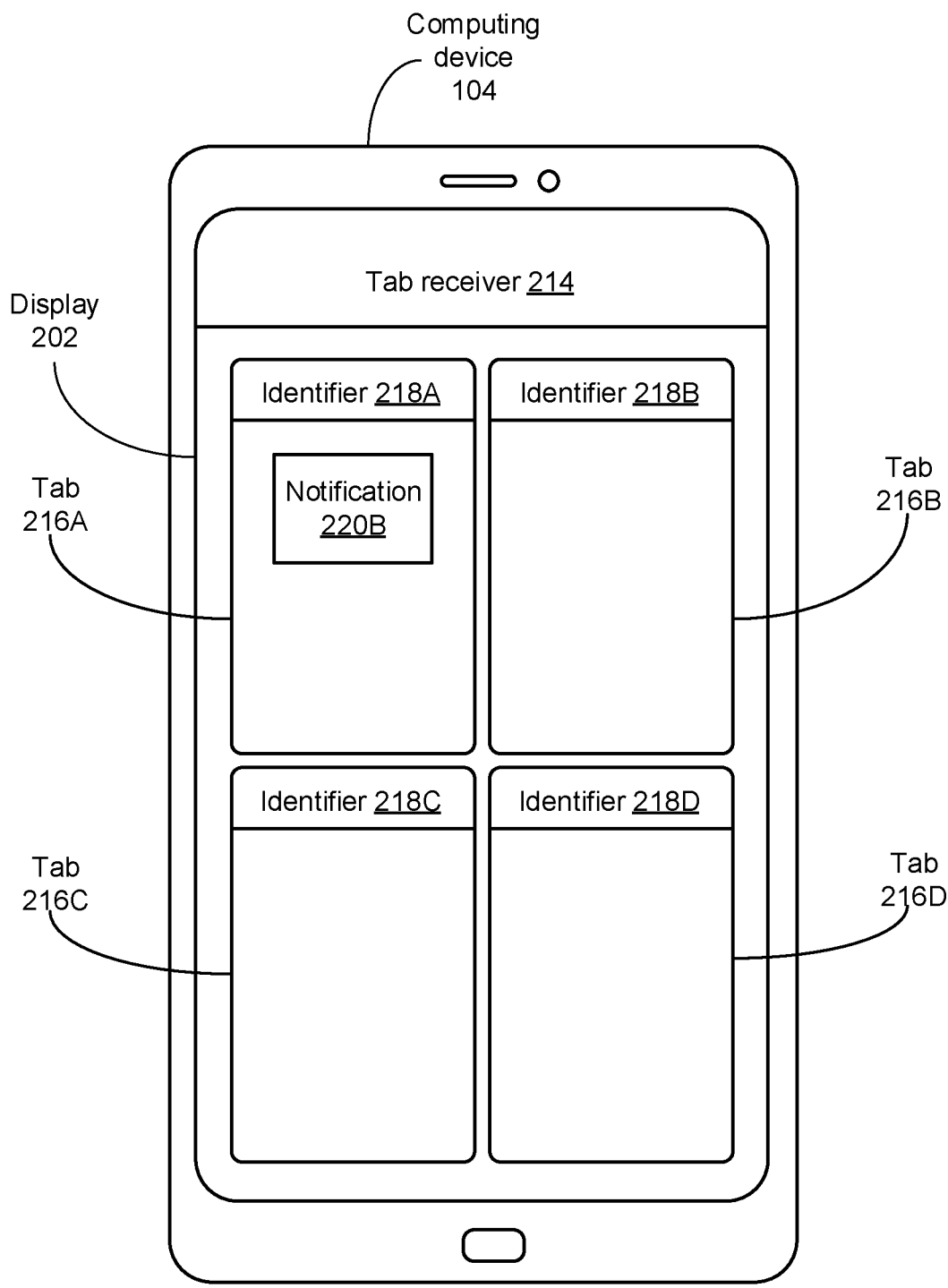
FIG. 2D shows a computing device presenting a notification according to another example implementation.

FIG. 2D shows the computing device 104 presenting a notification 220B according to another example implementation. In this example, the browser presented by the display 202 is showing four tabs 216A, 216B, 216C, 216D. The computing device 104 can present the notification 220B within the tab 216A in a similar manner, and in response to a similar notification and/or notification message, as described above with respect to FIG. 2C. In some examples, the computing device 104 can present the notification 220B within the identifier 218A and/or within the tab receiver 214, such as by causing the identifier 218A and/or tab receiver 214 to change color, flash, or present an alert signal such as an exclamation point ("!"), as non-limiting examples.

Figure 2E:
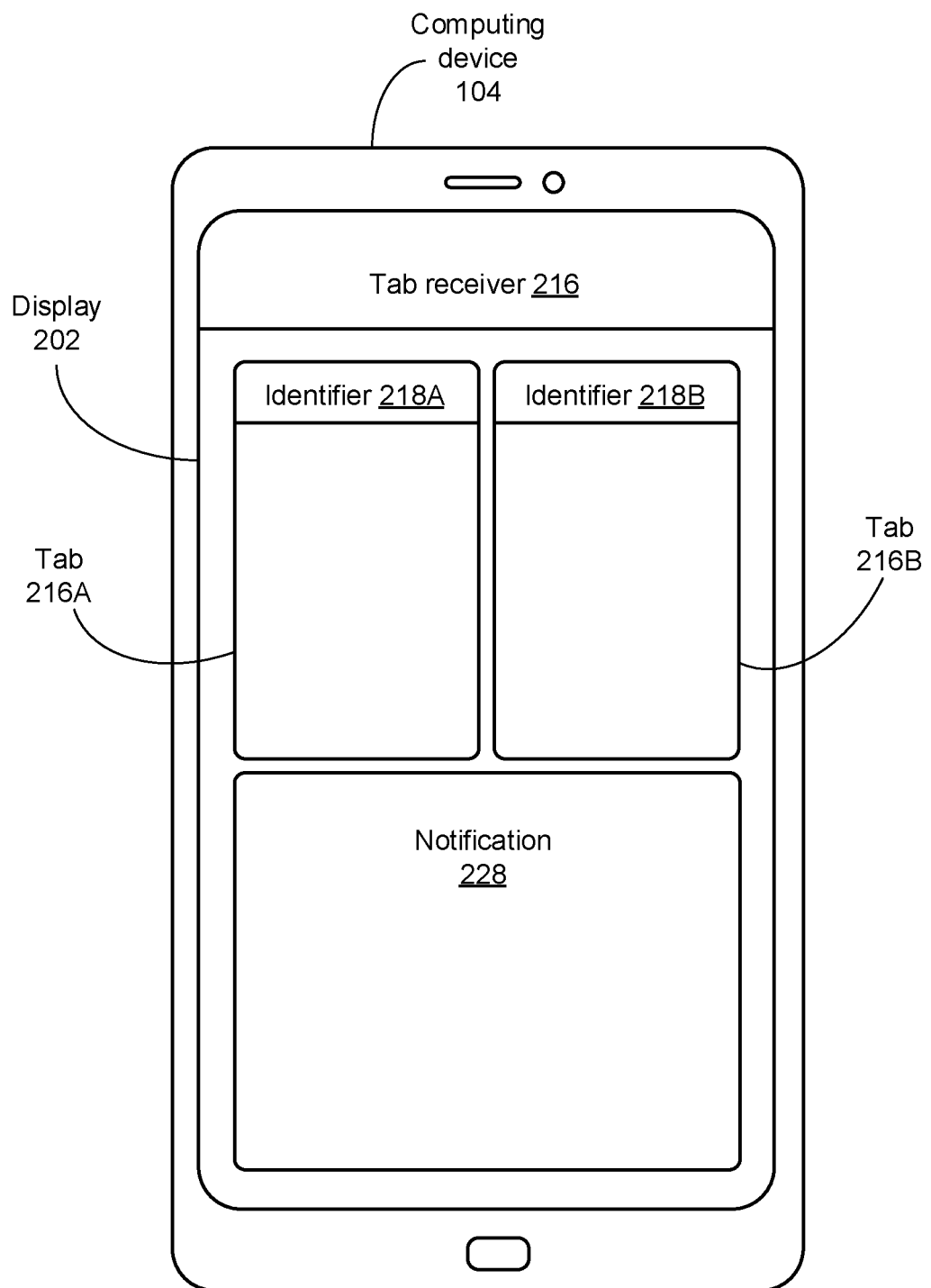
FIG. 2E shows a computing device presenting a notification according to another example implementation.

FIG. 2E shows the computing device 104 presenting a notification 228 according to another example implementation. In this example, the browser presented by the display 202 is showing two tabs 216A, 216B. The computing device 104 can present a notification 228 below the tabs 216A, 216B. The notification 228 can indicate a changed value of an attribute of an object, such as a reduced price of an item that the user was viewing on a stale tab. In some examples, the notification 228 can include a hyperlink to a webpage showing the reduced value of the attribute. In some examples, the notification 228 can include a hyperlink to a webpage with the item for sale at the reduced price.

Figure 2F:
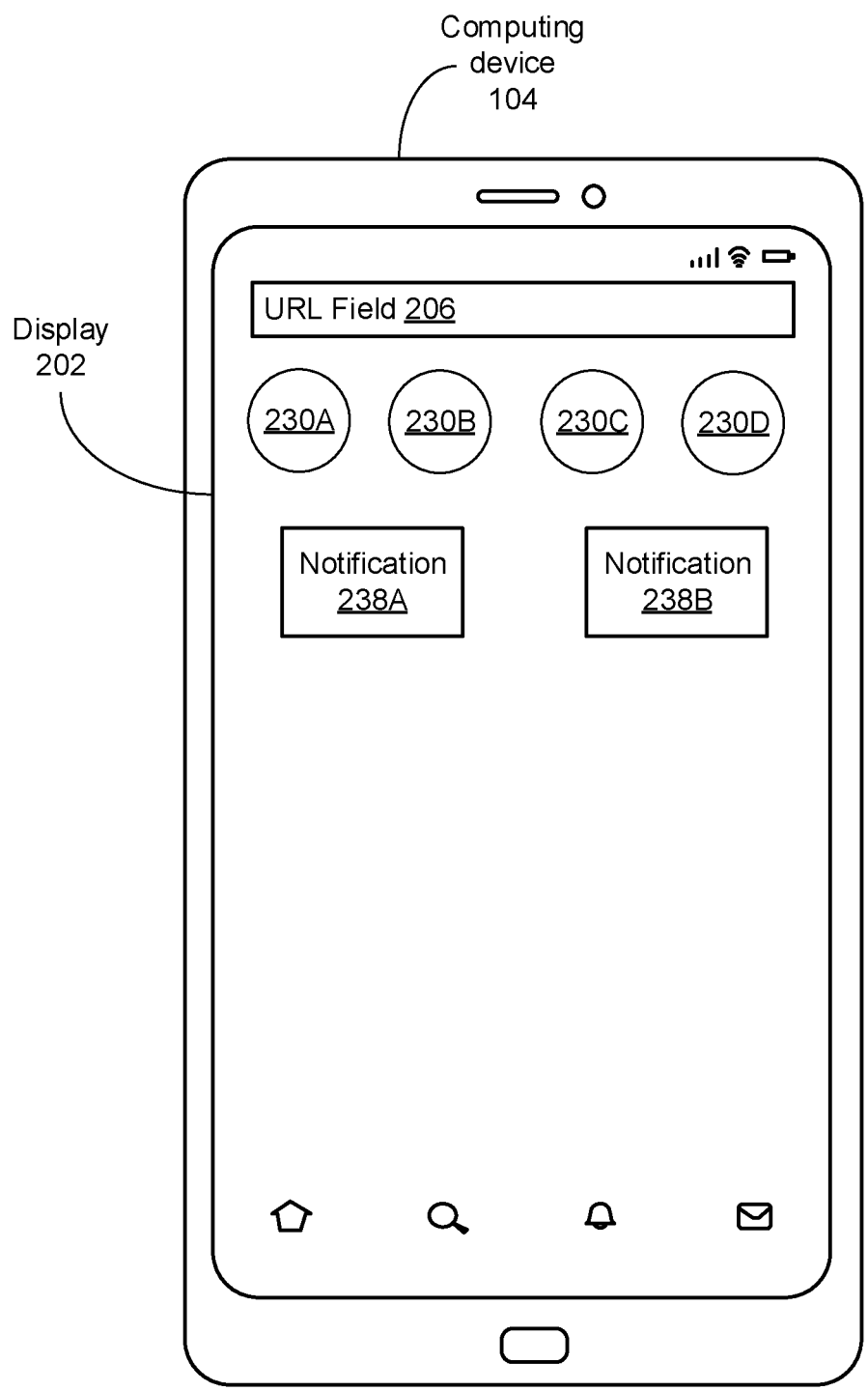
FIG. 2F shows a computing device presenting notifications according to another example implementation.

FIG. 2F shows the computing device 104 presenting notifications 238A, 238B according to another example implementation. FIG. 2F shows an example of the display 202 presenting the browser when the browser is initially opened and/or launched. The browser can include and/or present a URL field 206 into which the user can enter a URL of a website and/or search terms. The browser can include and/or present icons 230A, 230B, 230C, 230D representing websites that the user frequently visits, based on the user's browsing patterns when interacting with the browser. The icons 230A, 230B, 230C, 230D can include hyperlinks to the websites represented by the respective icons 230A, 230B, 230C, 230D.

In the example shown in FIG. 2F, the browser can present and/or include notifications 238A, 238B when the browser is initially opened and/or launched. The notifications 238A, 238B can each indicate a changed value of an attribute of an object, such as a reduced price of an item that the user was viewing on a stale tab. In some examples, the notifications 238A, 238B can each include a hyperlink to a webpage showing the reduced value of the attribute. In some examples, the notifications 238A, 238B can each include a hyperlink to a webpage with the item for sale at the reduced price.

Figure 2G:
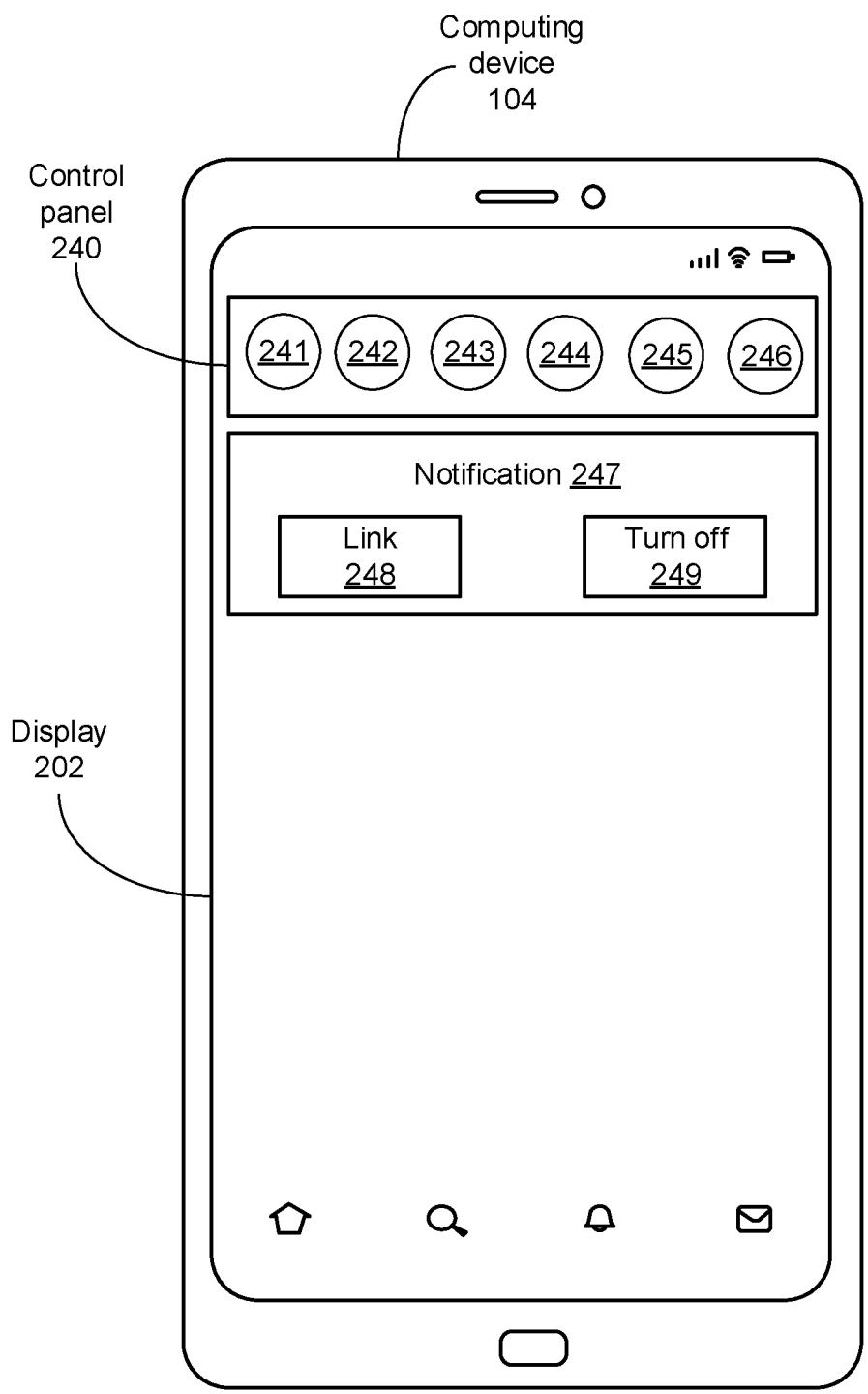
FIG. 2G shows a computing device presenting a notification according to another example implementation.

FIG. 2G shows the computing device 104 presenting a notification 247 according to another example implementation. In this example, the computing device 104 can present the notification 247 on the display 202, along with a control panel 240, in response to the user prompting the computing device 104 to present the control panel 240 and/or in response to the user powering the computing device 104 on.

The control panel 240 can include icons 241, 242, 243, 244, 245, 246 that can also serve and/or function as buttons. The icons 241, 242, 243, 244, 245, 246 can receive input from the user to control access to a wireless local area network (such as Institute for Electrical and Electronics Engineers (IEEE) 802.11 "Wireless Fidelity"), control access to a personal area network (such as IEEE 802.15 "Bluetooth"), toggle a blocking mode on or off, toggle a light on and off, toggle an auto-rotate mode on or off, and/or turn on or off a battery-saving mode, as non-limiting examples.

The notification 247 can include an indicator of a changed value of an attribute of an object, such as a reduced price of an item that the user was viewing on a stale tab. In some examples, the notification 247 can include a link 248, such as a hyperlink, to a webpage showing the reduced value of the attribute. In some examples, the notification 247 can include a link 248 to a webpage with the item for sale at the reduced price. In some examples, the notification 247 can include a turn off button 249 and/or a turn off link. The computing device 104 can respond to the user selecting the turn off button 249 by stopping notifications of changed values for the object for which the notification 247 is presenting the changed value, and/or stopping notifications of all changed values.

Figure 2H:
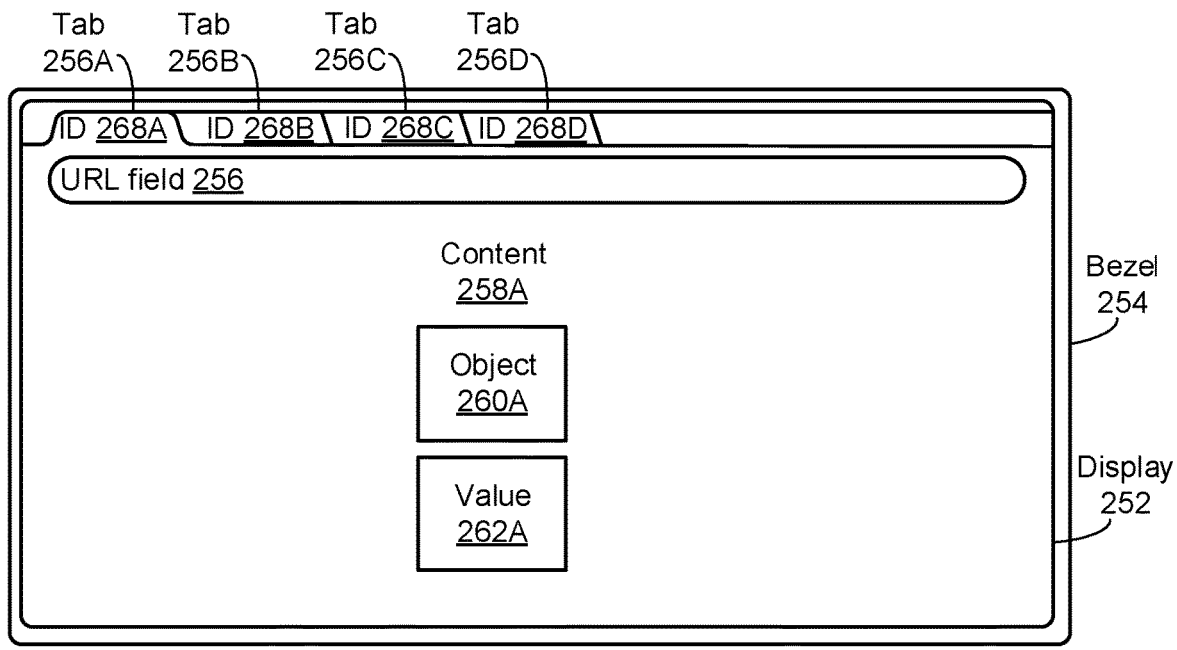
FIG. 2H shows a computing device with a browser presenting multiple tabs according to another example implementation.

FIG. 2H shows a computing device with a browser presenting multiple tabs 256A, 256B, 256C, 256D according to another example implementation. In this example, the computing device, which can include a desktop computing device, can include and/or be in communication with a monitor. The monitor can include a display 252 surrounded by a bezel 254.

The browser executing on the computing device can be presented by the display 252. The browser can present multiple tabs 256A, 256B, 256C, 256D. The tabs 256A, 256B, 256C, 256D can each be associated with a different website and/or URL. The tabs 256A, 256B, 256C, 256D can have similar features to the tabs 216A, 216B, 216C, 216D described above, including identifiers 268A, 268B, 268C, 268D of the URLs and/or webpages associated with the respective tab 256A, 256B, 256C, 256D. The browser can include a URL field 256 that presents a URL of an active tab, which, in the example shown in FIG. 2H, is tab 256A. The browser can present content 258A based on a webpage received from a server and/or site host associated with the URL of the tab 256A. The content 258A can include an object 260A and a value 262A. The object 260A and value 262A can have similar features as the objects 210A, 210C, 210D and values 212A, 212C, 212D described above.

Figure 2I:
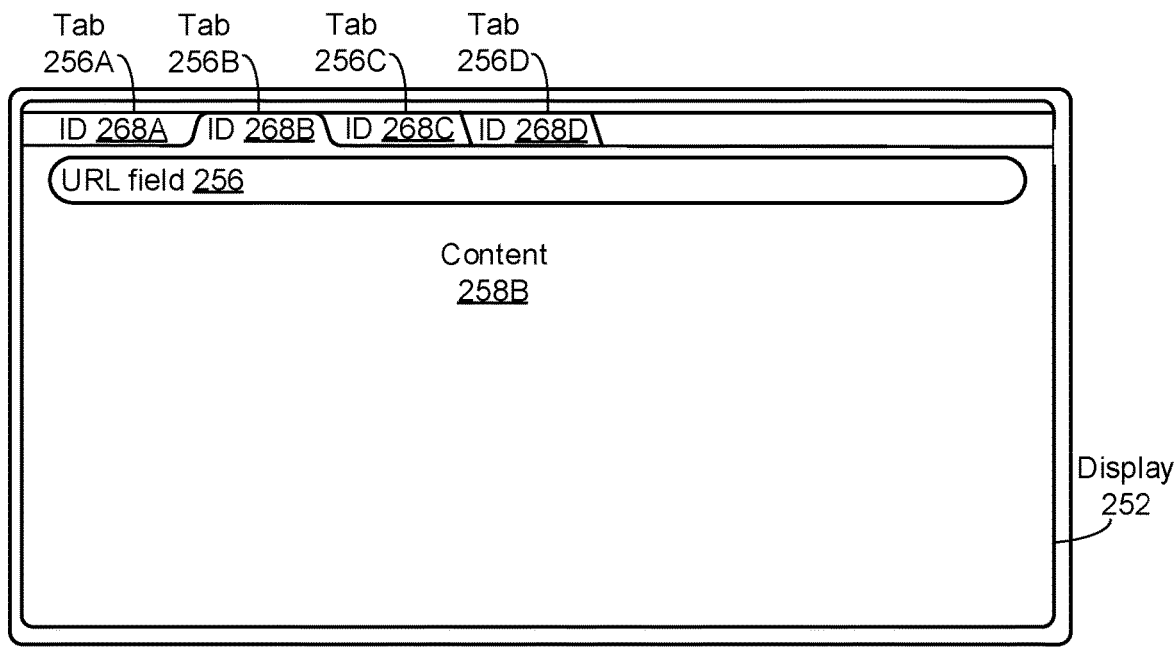
FIG. 2I shows a computing device with a browser presenting multiple tabs according to another example implementation.

FIG. 2I shows a computing device with a browser presenting multiple tabs 256A, 256B, 256C, 256D according to another example implementation. The computing device and browser of FIG. 2I have similar features as the computing device and browser described with respect to FIG. 2H. In the example shown in FIG. 2I, tab 256B is the active tab, the browser presents content 258B based on a webpage received from a server and/or site host associated with the URL of the tab 256B.

Figure 3A:
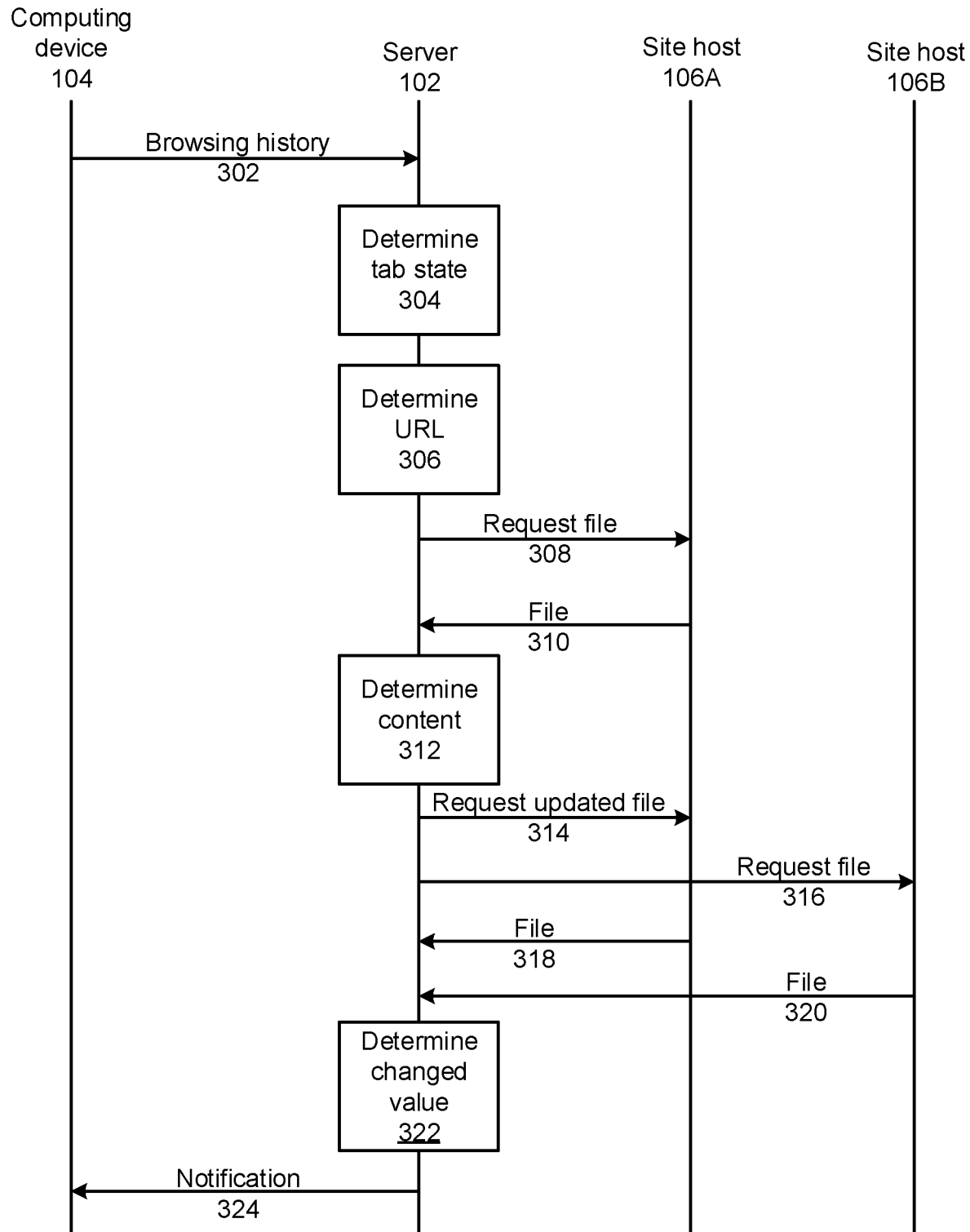
FIG. 3A is a timing diagram according to an example implementation.

FIG. 3A is a timing diagram according to an example implementation. The computing device 104 can present a browser to a user, as discussed above with respect to FIGS. 2A and 2B. The user can visit various websites via tabs 216A, 216B, 216C, 216D generated by a browser executing on the computing device 104. The computing device 104 can send browsing history 302 to the server 102. If the user has consented to having the user's browsing history 302 sent to the server 102, the computing device 104 can send the browsing history 302 to the server 102, or to any device outside the computing device 104. The computing device 104 can specifically ask, such as via a textual message presented on the display 202, the user whether the user consents to and/or desires to have the user's browsing history 302 shared with the server 102 and/or other devices or organizations outside the computing device, such as for purposes of improving the user's browsing experience and/or to present the user with information regarding changed values of objects such as price drops.

The browsing history 302 can include which websites the user visited via the computing device 104, when the user visited the websites via the computing device 104, which websites were associated with tabs 216A, 216B, 216C, 216D that remained open in the browser executing on the computing device 104, and/or when and whether the user interacted with and/or provided input into the tabs 216A, 216B, 216C, 216D associated with the websites.

Figure 3B:
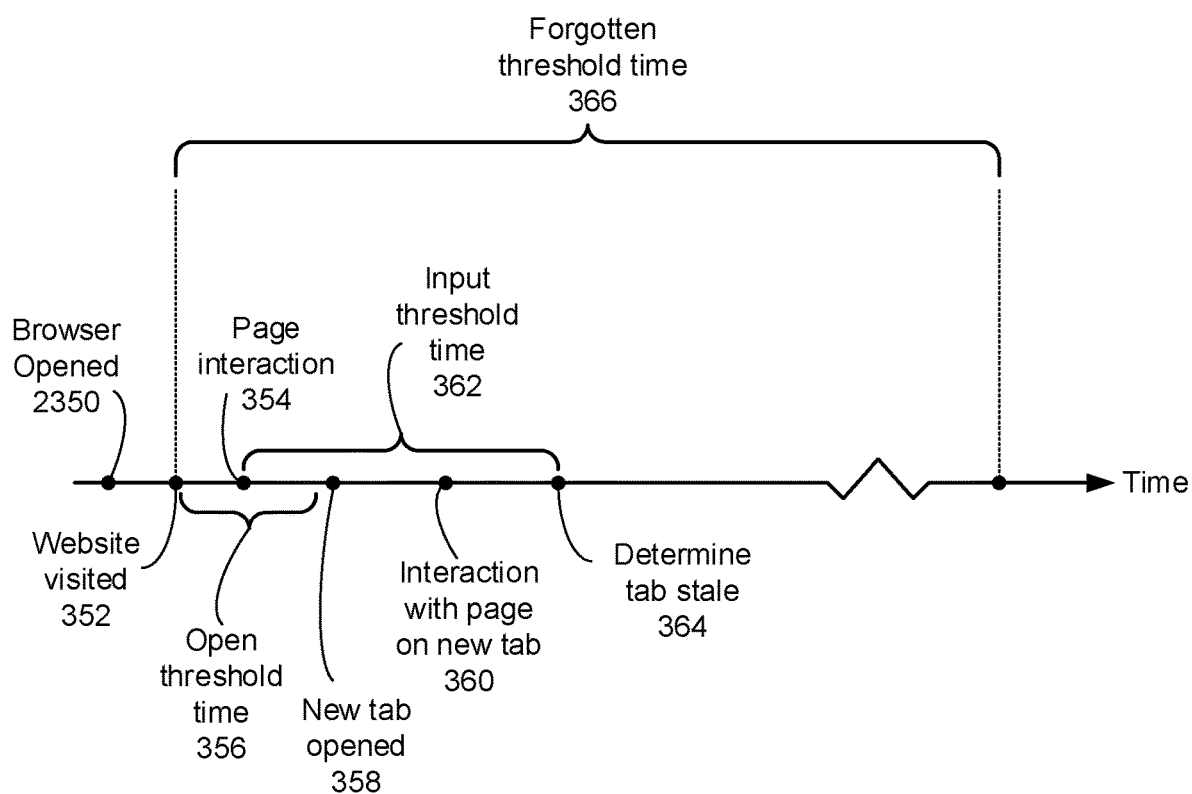
FIG. 3B is a timeline according to an example implementation.

Based on the browsing history 302 received from the computing device 104, the server 102 can determine the tab state (304) of tabs 216A, 216B, 216C, 216D that have been opened on the browser executing on the computing device 104. Determining the tab state (304) can include determining whether a tab 216A, 216B, 216C, 216D is stale, whether each tab 216A, 216B, 216C, 216D opened on the browser is stale, and/or determining which tab(s) 216A, 216B, 216C, 216D is stale. In some examples, the server 102 can determine that a tab 216A, 216B, 216C, 216D is stale based on the tab 216A, 216B, 216C, 216D having been open on the browser for at least an open threshold time, and determining that the browser has not received input into the tab 216A, 216B, 216C, 216D for at least an input threshold time. In some examples, determining that the tab 216A, 216B, 216C, 216D is stale can also include determining that the tab 216A, 216B, 216C, 216D has been open on the browser for less than a forgotten threshold time. A timeline for determining that the tab is stale (304) is shown in FIG. 3B.

In some examples, the server 102 can determine the tab state (304) based on a tab state message received from the computing device 104. In some examples, the computing device 104 can determine the tab state, such as determining whether a tab is stale, in a similar manner as described with respect to the server 102 describing the tab state. Based on the determination of the tab state by the computing device 104, the computing device 104 can send a tab state message to the server 102. The tab state message can indicate the tab state(s) of one or more tabs, such as whether a tab is stale. The server 102 can determine the tab state(s) (304) based on the indication of the tab state(s) included in the tab state message.

The server 102 can also determine a URL (306) associated with a stale tab. In some examples, the server 102 can determine the URL (306) associated with the stale tab based on the browsing history 302 including the browser performing a GET method associated with the tab according to the Hypertext Transfer Protocol (HTTP), with the GET method identifying the URL.

The server 102 can request a file 308 from a site host 106A. The site host 106A can include a server that hosts a website identified by the URL. The site host 106A can store a file, such as a webpage, identified by the URL. The site host 106A can respond to the request file 308 message by sending the file, which can include the webpage identified by the URL, to the server 102.

After receiving the file 310, the server 102 can determine the content (312) of the file. Determining the content (312) can included determining an object 210A, 210C, 210B presented by the content, and/or the value 212A, 212C, 212D of an attribute of the object 210A, 210C, 210D. In some examples, the server 102 can determine the object 210A, 210C, 210D based on classifying an image included in the content, and/or by interpreting text included in the content. In some examples, the server 102 can determine the object 210A, 210C, 210D based on browsing patterns of the browser and/or computing device 104 monitored by the server 102, such as the user visiting, via the browser executing on the computing device 104, websites known to be associated with the object.

In some examples, the server 102 can determine whether the webpage is presenting specific enough information to monitor. For example, if the server 102 determines that the webpage is presenting more than a threshold number of objects, such as fifty, the server 102 will not monitor the value for the object or perform any additional actions with respect to the object. Limiting the number of objects to monitor and/or track values for avoids overwhelming the user with excessive information.

After determining the content (312) and/or object 210A, 210C, 210D, the server 102 can request an updated file 314 from the site host 106A. In some examples, the server 102 can also request a file(s) 316 from one or more additional site hosts 106B (which can include servers that host websites associated with second and/or additional URLs), other than the site host that hosts the website identified by the URL associated with the stale tab, which are known to the server 102 to include content associated with the object 210A, 210C, 210D. The site hosts 106A, 106B can respond to the requests 314, 316 by sending files 318, 320 to the server 102. The files 318, 320 can include webpages with content associated with the object 210A, 210C, 210D. The file 318 can include a most recent webpage identified by the URL associated with the stale tab. In some examples, the server 102 can send the requests 314, 316 periodically. Receiving files 320 from site hosts 106B other than the site host 106A which maintains the webpage that the user actually visited can allow notifications to be based on prices of competitors to the site host 106A that maintains the webpage that the user visited, and/or track alternate sources of information with respect to the object.

In some examples, a publisher and/or administrator of a website maintained by a site host 106A, 106B can decide not to participate in having values of objects presented by the webpages maintained by the site host 106A, 106B monitored and/or tracked. In some examples, the request 314, 316 can have an indicator that the request is for tracking and/or monitoring purposes, prompting the site host 106A, 106B to not respond to the request 314, 316. In some examples, the file 318, 320 can included an indicator that the site host 106A, 106B does not wish to participate in tracking or monitoring of values, and the server 102 will not send additional requests 314, 316 to that site host 106A, 106B, and will not determine a changed value (322) based on any files 318, 320 received from that site host 106A, 106B.

Based on the recent file(s) 318, 320, the server 102 can determine a changed value (322). Determining the changed value (322) can include determining the value 212A, 212C, 212D of the attribute associated with the object 210A, 210C, 210D. The server 102 can determine the value 212A, 212C, 212D based on text and/or a number that is proximal and/or adjacent to the object 210A, 210C, 210D. In some examples in which the server 102 requests the updated file 314 only from the site host 106A that hosts the website identified by the URL associated with the stale tab, the server 102 can determine that the value 212A, 212C, 212D has changed based on updated content included in the file 318 including changed text and/or an updated number. In some examples, the server 102 can determine that the value 212A, 212C, 212D has changed based on a difference between a highest or lowest value among values retrieved from the site hosts 106A, 106B meeting a threshold difference from an original or previous value. The original or previous value can be the value most recently presented to the user by the stale tab.

After determining the changed value (322), the server 102 can send a notification 324 to the computing device 104. The notification 324, which can also be considered a notification message, can prompt the browser executing on the computing device 104 to present visual output, which can be a notification that the value of the attribute associated with the object 210A, 210C, 210D has changed. The notification 220A, 220B presented by the browser, described above with respect to FIGS. 2C and 2D, can identify the object 210A, 210C, 210D and the updated and/or changed value. In some examples, the server 102 can send the notifications 324 of changed and/or updated values to the computing device 104 periodically. In some examples, the server 102 can send the notifications 324 of changed and/or updated values to the computing device 104 in response to determining that the value has changed (322), and/or based on determining that the value has changed by at least a change threshold value. In some examples, the user can log into multiple different computing devices with a same account, such as at different times, and the server 102 can send the notification 324 to a different computing device than the computing device 104 on which the browser was executing when the server 102 determined that the tab was stale. In some examples the user is logged into an account while using the browser, the server 102 can send the notifications 324 of changed and/or updated values to accounts associated with the user and/or the account logged into the browser, such as an email to an email address associated with the user or a text message to a telephone number associated with the user.

The server 102 can perform the monitoring of websites for values of the object, and sending the notification, including the determining the tab state (304), determining the URL (306), requesting the file 308, determining the content (312), requesting the updated file 314 and requesting the file 316, determining the changed value (322), and/or sending the notification, automatically and without user involvement or receiving a request from the user to set a price alert (other than receiving the user's consent).

FIG. 3B is a timeline according to an example implementation. The timeline shows events that can cause a tab, such as any of the tabs 216A, 216B, 256A, 256B, 256C, 256D described above, to be considered stale.

The browser can be opened (350), such as by the user launching the browser application. The user can visit a website (352) via a tab on the browser, which can start a clock running, and/or cause the computing device 104 to store a reference time for an open threshold time 356. After visiting the website (352), the user can interact with the page (354) presented by the browser based on a page received by the browser from the website, such as clicking on links generated based on the webpage. Interacting with the page (354), such as by scrolling through content rendered in the tab presenting the page, clicking on or tapping on any content items rendered in the tab presenting the page, and/or entering any values into fields included in the webpage presented by the tab, can restart a clock and/or cause the computing device 104 to write over a reference time for an input threshold time 362. The user can open a new tab (358), and stop interacting with the tab that the user interacted with at (354). The user can interact with a webpage on the new tab (360). After the input threshold time 362 has expired and/or elapsed, the server 102 and/or computing device 104 can determine, based on the tab having been open for at least the open threshold time (356) and the user not having interacted with the webpage for at least the input threshold time 362, and/or a forgotten threshold time 366 not having elapsed, that the tab is stale (364).

Figure 4:
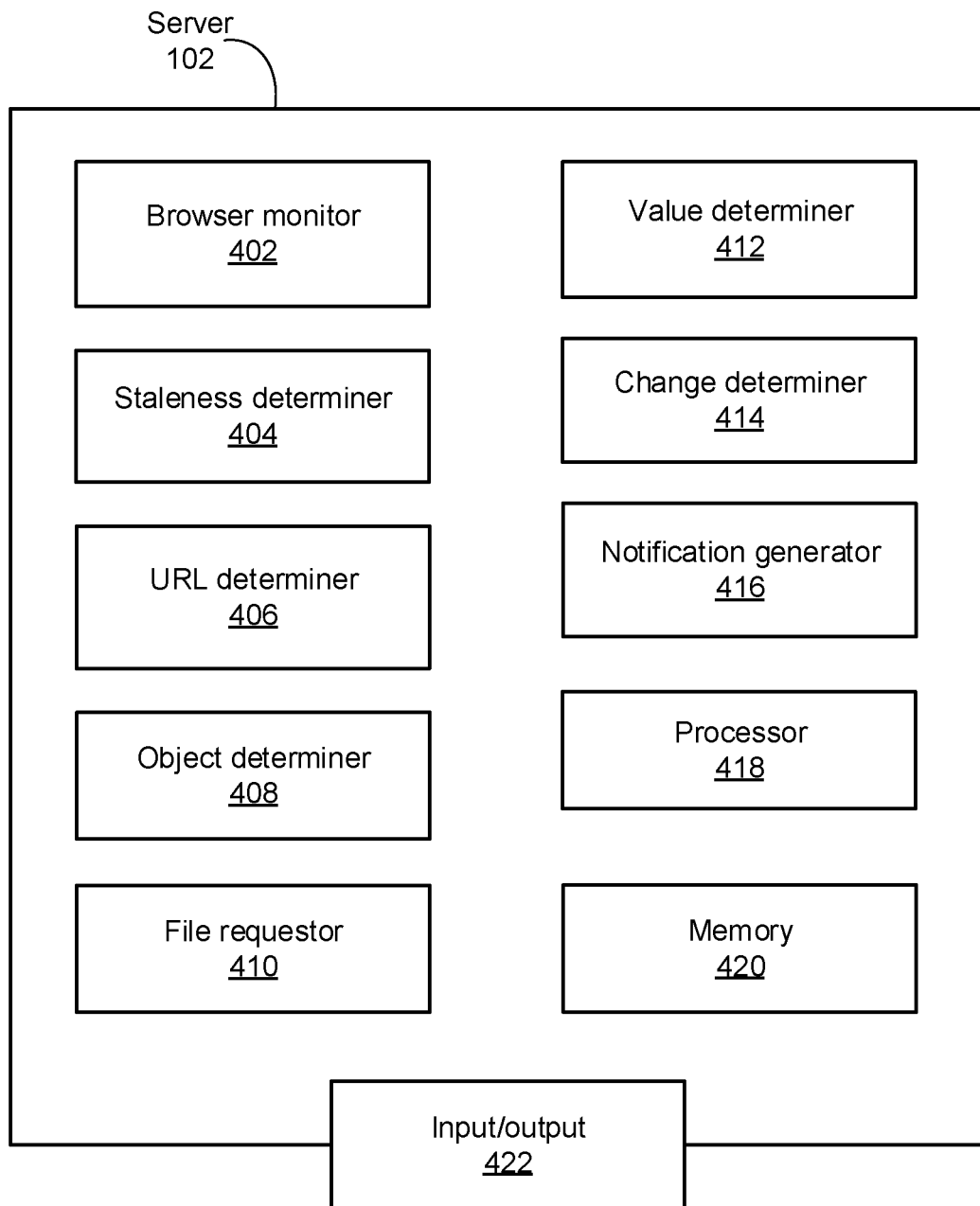
FIG. 4 is a block diagram of a server according to an example implementation.

FIG. 4 is a block diagram of the server 102 according to an example implementation. While functions, methods, and/or techniques are described herein as being performed by the server 102, they may be performed by any combination of the server 102 and computing device 104, such as a division of tasks between the server 102 and computing device 104, or wholly performed by the computing device 104.

The server 102 can include a browser monitor 402. The browser monitor 402 can monitor the browsing history of a computing device 104 in communication with the server 102. The browser monitor 402 can receive data from the browser of the computing device 104 indicating which websites the browser has visited, which tabs have been opened on the browser, what URLs are associated with the opened tabs, and/or when the user has interacted with the opened tabs.

The server 102 can include a staleness determiner 404. The staleness determiner 404 can determine whether, and/or that, a tab 216A, 216B, 216C, 216D opened on a browser of the computing device 104 is stale. The staleness determiner 404 can determine that a tab 216A, 216B, 216C, 216D is stale based, for example, on the tab 216A, 216B, 216C, 216D being open on the browser (a tab can be considered open on a browser when the browser presents an identifier 218A, 218B, 218C, 218D 268A, 268B, 268C, 268D of a webpage and/or website presented by the tab and/or the browser is maintaining communication with a server serving a website associated with the tab) for at least an open threshold time, and/or based on the browser not receiving input into the tab 216A, 216B, 216C, 216D for at least an input threshold time. In some examples the staleness determiner 404 can determine that the tab 216A, 216B, 216C, 216D is stale based on the tab being open on the browser for less than a forgotten threshold time.

The server 102 can include a URL determiner 406. The URL determiner 406 can determine a universal resource locator (URL) associated with the stale tab 216A, 216B, 216C, 216D. In some examples, the URL determiner 406 can determine the URL based on the browser requesting a file from a server hosting a website identified by the URL, such as by performing a GET method associated with the tab 216A, 216B, 216C, 216D. The GET method can be performed according to HTTP, and can identify the URL.

The server 102 can include an object determiner 408. The object determiner 408 can determine an object 210A, 210C, 210D that is associated with and/or corresponds to the content 208A, 208C, 208D presented by the stale tab 216A, 216B, 216C, 216D and/or associated with the URL. The object determiner 408 can determine the object 210A, 210C, 210D based, for example, on an image and/or image file included in the content 208A, 208C, 208D, based on text included in in the content 208A, 208C, 208D, based on a International Standard Book Number (ISBN) included in the content 208A, 208C, 208D, based on a Universal Product Code (UPC) code included in the content 208A, 208C, 208D, and/or based on browsing patterns indicating that the URL is associated with the object 210A, 210C, 210D. Browsing patterns can include browsing patterns by the user and/or other users monitored by the server 102, such as websites and/or webpages visited in temporal proximity to each other indicating that the websites and/or webpages present a same object, and/or the user and/or other users opening or closing webpages at the same time, indicating that the webpages opened or closed at the same time present the same object.

The server 102 can include a file requestor 410. The file requestor 410 can request files, such as webpages, from the site host 106A that hosts the website identified by the URL associated with the stale tab 216A, 216B, 216C, 216D. In some examples, the file requestor 410 can request files, such as webpages, from one or more other site hosts 106B that host websites with content similar to the object 210A, 210C, 210D.

The server 102 can include a value determiner 412. The value determiner 412 can determine the value 212A, 212C, 212D of the attribute of the object 210A, 210C, 210D. The value determiner 412 can determine the value 212A, 212C, 212D based on text and/or a number included in the file and/or webpage received from the site host(s) 106A, 106B. In some examples, the value determiner 412 can determine the value 212A, 212C, 212D as a lowest or highest value from the files and/or webpages received from the site host(s) 106A, 106B. In some examples, the value determiner 412 can determine the value 212A, 212C, 212D based on text and/or a number that is adjacent to the image and/or text representing the object 210A, 210C, 210D.

The server 102 can include a change determiner 414. In some examples, the change determiner 414 can determine that the value 212A, 212C, 212D of the attribute of the object 210A, 210C, 210D has changed, and/or that the value 212A, 212C, 212D has changed by at least a change threshold value. The change threshold value can be an absolute value, and/or can be a fraction (such as a percentage) of an original value. In some examples, the change threshold value can be a change in a particular direction, such as a lower value. The change can be in reference to an original value 212A, 212C, 212D presented by the browser such as within the stale tab, and/or in reference to a most recent value presented in a notification 220A, 220B.

In some examples, the change determiner 414 can determine that the value 212A, 212C, 212D of the attribute of the object 210A, 210C, 210D has changed to, and/or reached, a predefined and/or threshold value. In some examples, the predefined and/or threshold value can be a value provided and/or inputted by a user. In some examples, the predefined and/or threshold value can be a value that the server 102 has determined attracts interest in the object, such as based on users entering information into the webpage and/or interacting with the webpage when the webpage presents the object with the value that the server 102 determines is a predefined and/or threshold value at which the server 102 should generate a notification.

In some examples, the change determiner 414 can determine that the value 212A, 212C, 212D of the attribute of the object 210A, 210C, 210D has changed based on a categorical value of the object changing. For example, if the object is weather, the change determiner 414 can determine that the value 212A, 212C, 212D of the attribute of the object 210A, 210C, 210D has changed based on the type of weather changing from sunny to rainy, or based on the categorical value changing to a predetermined category, such as rainy.

The server 102 can include a notification generator 416. The notification generator 416 can generate and send notifications 324 to the computing device 104. The notification 324 can prompt the browser executing on the computing device 104 to present visual output indicating that the value of the attribute of the object 210A, 210C, 210D has changed. The visual output can include text and/or an image identifying the object 210A, 210C, 210D. In some examples, the server 102 can generate and send the notifications 324 to the computing device 104 periodically. In some examples, the server 102 can generate and send the notifications 324 to the computing device 104 based on, and/or in response to, the value associated with the attribute changing and/or changing by the change threshold value. In some examples, the notification can indicate that the value has changed. In some examples, the notification can indicate the particular value, as well as the units of the value. In some examples, the notification can include an electronic message, such as an email, a text message, or a telephone call, that the server 102 sends to an account associated with the computing device 104.

The server 102 can include at least one processor 418. The at least one processor 418 can execute instructions, such as instructions stored in at least one memory device 420, to cause the server 102 to perform any combination of methods, functions, and/or techniques described herein.

The server 102 can include at least one memory device 420. The at least one memory device 420 can include a non-transitory computer-readable storage medium. The at least one memory device 420 can store data and instructions thereon that, when executed by at least one processor, such as the processor 418, are configured to cause the server 102 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the server 102 can be configured to perform, alone, or in combination with the server 102, any combination of methods, functions, and/or techniques described herein.

The server 102 can include at least one input/output node 422. The at least one input/output node 422 may receive and/or send data, such as from and/or to, the computing device 104 and site hosts 106A, 106B, and/or may receive input and provide output from and to a user. The input and output functions may be combined into a single node, or may be divided into separate input and output nodes. While the functions, methods, and/or techniques have been described herein as being performed by the server 102 with respect to the computing device 104, they can be performed by the server 102 with respect to any number of computing devices that execute browsers.

Figure 5:
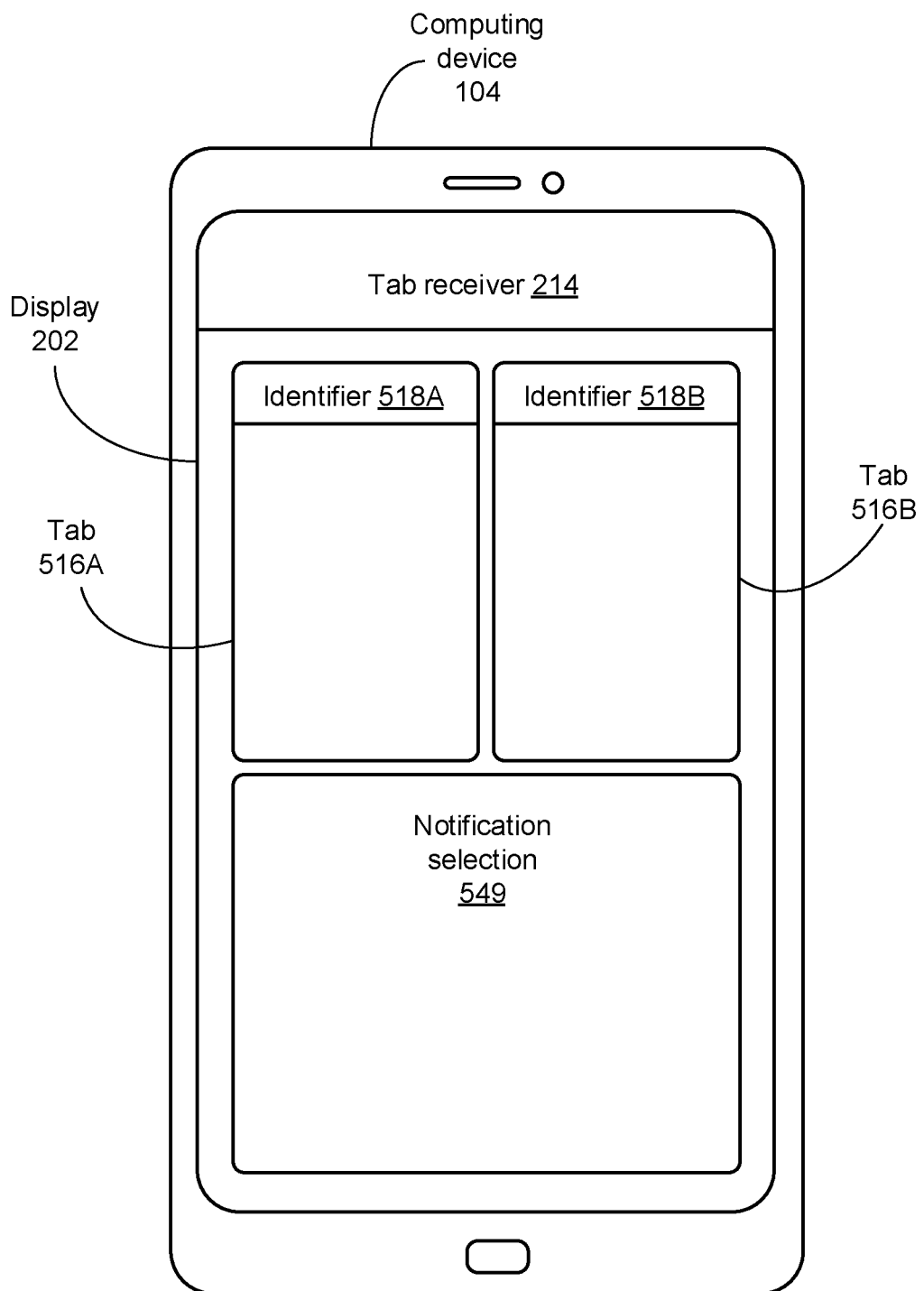
FIG. 5 shows a computing device presenting a notification selector according to an example implementation.

FIG. 5 shows the computing device 104 presenting a notification selector 549 according to an example implementation. The display 202 of the computing device 104 can present a browser with similar features to those of the browser(s) described above. The browser can include the tab receiver 214. The browser can include tabs 516A, 516B with identifiers 518A, 518B that are similar to the tabs 216A, 216B and identifiers 218A, 218B described above.

In the example shown in FIG. 5, the browser can include and/or present a notification selector 559. The notification selector 549 can include a button or other input node or field by which the user can opt into notifications of changes of values of attributes of objects, such as reductions in prices.

Figure 6A:
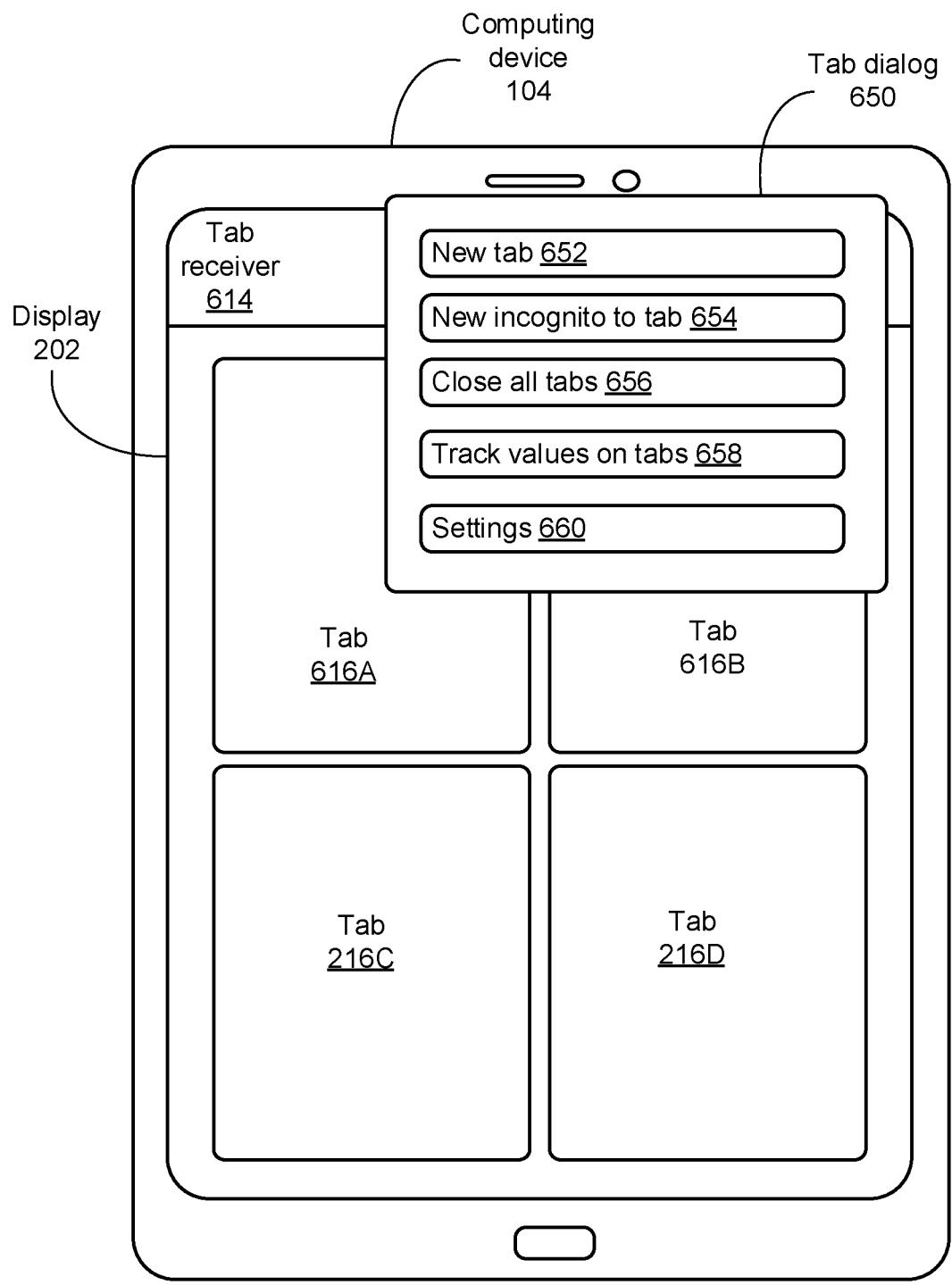
FIG. 6A shows a computing device presenting a tab dialog according to an example implementation.

FIG. 6A shows the computing device 104 presenting a tab dialog 650 according to an example implementation. A browser executing on the computing device 104 can present a tab receiver 614 and tabs 616A, 616B, 616C, 616D similar to the tab receiver 214 and tabs 216A, 216B, 216C, 216D described above. In response to input into the tab receiver 614, the browser can present, via the display 202, a tab dialog. The tab dialog 650 can present a new tab button 652 giving the user an option to create a new tab, a new incognito button 654 giving the user an option to create a new tab in "incognito" or private mode, a close all tabs button 656, a track values on tabs button 658 that responds to selection by presenting a tracking dialog 670 shown in FIG. 6B, and a settings button 660 giving the user an option to change some settings.

Figure 6B:
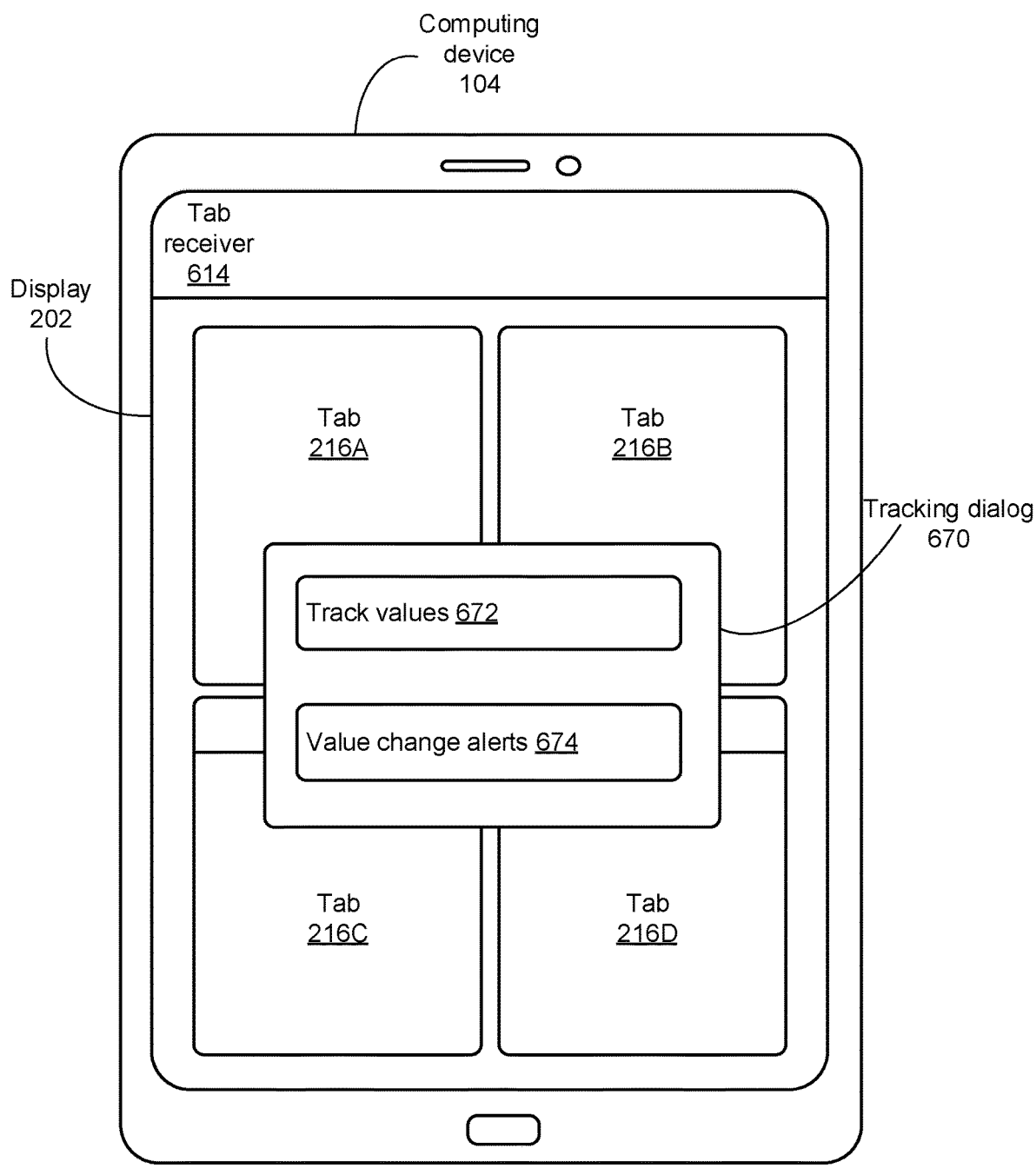
FIG. 6B shows the computing device of FIG. 6A presenting a tracking dialog according to an example implementation.

FIG. 6B shows the computing device 104 of FIG. 6A presenting a tracking dialog 670 according to an example implementation. The computing device 104 can present the tracking dialog 670 in response to the user selecting the track values on tabs button 658 shown in FIG. 6A.

The tracking dialog 670 can include a track values button that allows the user to select and/or toggle whether the computing device 104, in communication with the server 102, tracks values of objects associated with stale tabs, such as prices. The tracking dialog 670 can include a value change alerts button 674 that allows the user to select and/or toggle whether the computing device 104, in communication with the server 102, presents alerts and/or notifications of changes of values of objects associated with stale tabs, such as alerts of price drops of items for sale.

Figure 7:
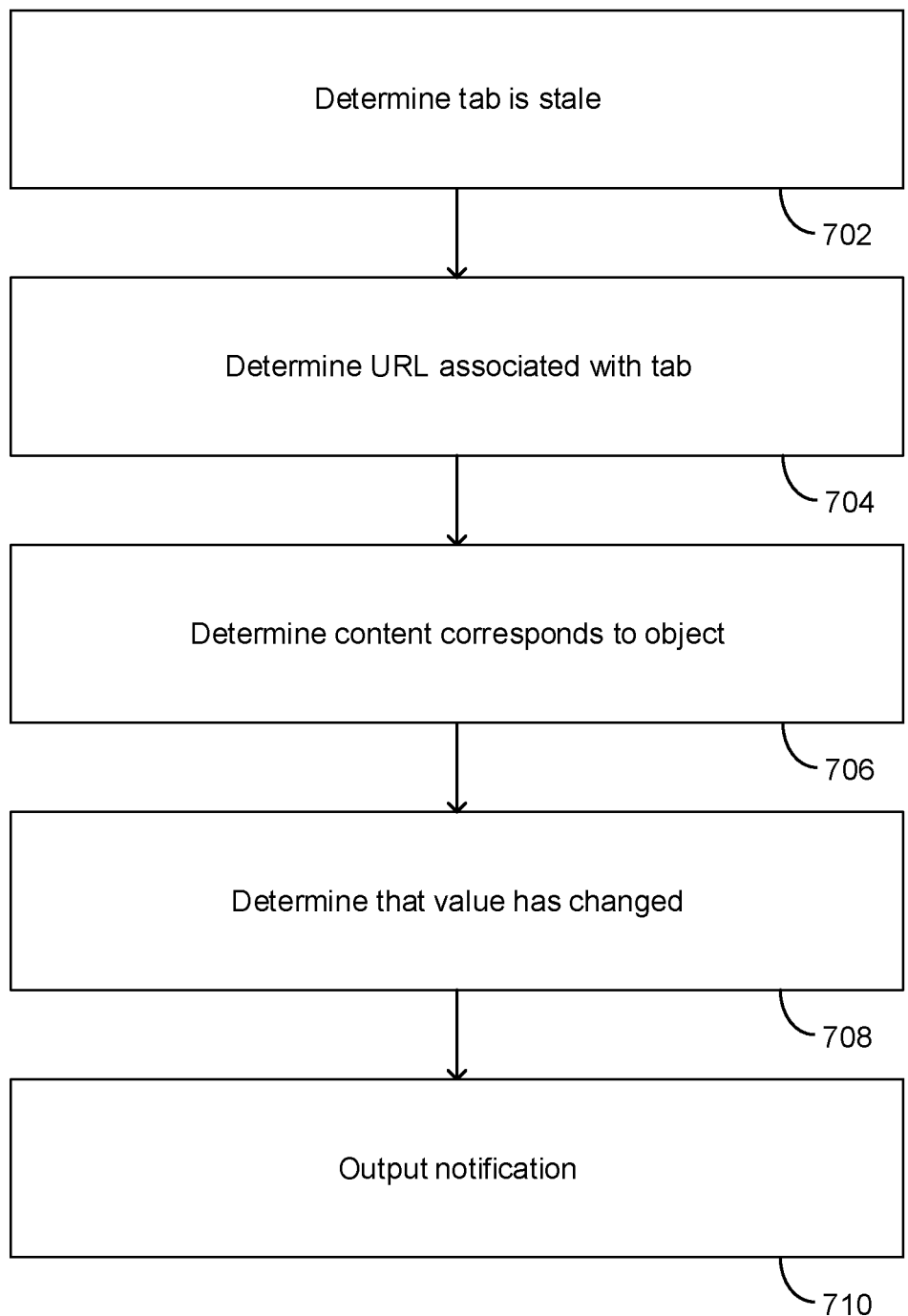
FIG. 7 is a flowchart of a method according to an example implementation.

FIG. 7 is a flowchart of a method according to an example implementation. The method can include determining that a tab is stale (702). The method can include determining a first universal resource locator (URL) associated with the tab (704). The method can include determining that content presented by the stale tab corresponds to an object that is also presented by content associated with a second URL (706). The method can include determining, based on content associated with at least one of the first URL or the second URL, that a value of an attribute associated with the object has changed from the value of the attribute when the tab presented the object (708). The method can include outputting a notification that the value of the attribute associated with the object has changed (710)

In some examples, the determining that the tab is stale can include determining that the tab has been open on a browser for at least an open threshold time, and determining that the browser has not received input into the tab for at least an input threshold time.

In some examples, the determining that the tab is stale further can further include determining that the tab has been open on the browser for less than a forgotten threshold time.

In some examples, the determining the first URL associated with the tab can include determining the first URL based on sending a request associated with the tab, the request identifying the first URL.

In some examples, the determining that the content presented by the stale tab corresponds to the object can include determining that the content presented by the stale tab corresponds to the object based on an image included in the content presented by the stale tab.

In some examples, the determining that the content presented by the stale tab corresponds to the object can include determining that the content presented by the stale tab corresponds to the object based on text included in the content presented by the stale tab.

In some examples, the determining that the content presented by the stale tab corresponds to the object can include determining that the content presented by the stale tab corresponds to the object based on browsing patterns.

In some examples, the determining that the value of the attribute associated with the object has changed can include determining that the value of the attribute associated with the object has changed based on updated content associated with at least one of the first URL or the second URL including changed text, the changed text being associated with the attribute.

In some examples, the determining that the attribute associated with the object has changed can include determining that the attribute associated with the object has changed based on updated content associated with at least one of the first URL or the second URL including an updated number, the updated number being associated with the attribute.

In some examples, the notification can include text identifying the object and indicating the value of the attribute.

In some examples, the notification can prompt a browser to present visual output indicating that the value of the attribute has changed.

In some examples, the notification can prompt a browser to present visual output indicating the value of the attribute.

In some examples, the outputting the notification can be performed periodically.

In some examples, the outputting the notification can be performed in response to the determination that the value associated with the attribute has changed.

In some examples, the method can further include determining that the value of the attribute associated with the object has changed by at least a change threshold value. The outputting the notification that the value of the attribute associated with the object has changed can include sending, to a browser, the notification that the value of the attribute associated with the object has changed in response to the determining that the attribute associated with the object has changed by at least the change threshold value.

In some examples, the tab can be included on a first browser executing on a first computing device, and the method can further include sending, to a second browser executing on a second computing device, a notification that the value of the attribute associated with the object has changed.

Figure 8:
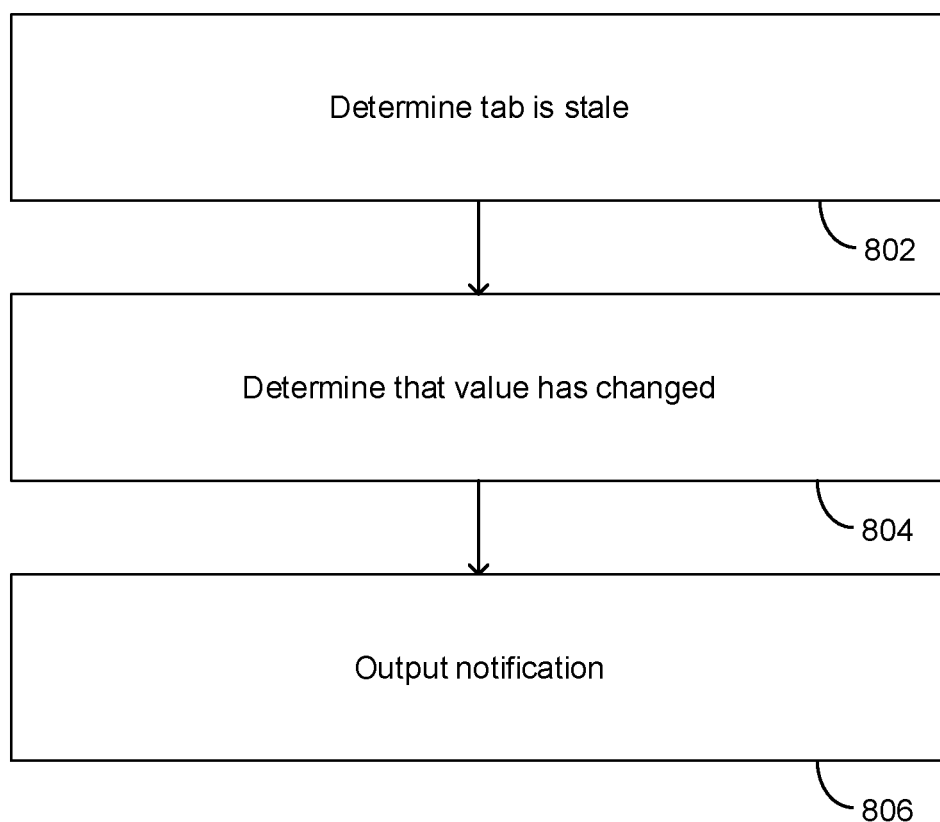
FIG. 8 is a flowchart of a method according to an example implementation.

FIG. 8 is a flowchart of a method according to an example implementation. The method can include determining that a tab is stale (802). The determining that the tab is stale can include determining that the tab has been open for at least an open threshold time, and determining that the tab has not received input for at least an input threshold time. The method can include determining that a value of an attribute associated with an object presented by the tab has changed (804). The method can include outputting a notification that the value of the attribute associated with the object has changed (806).

Figure 9:
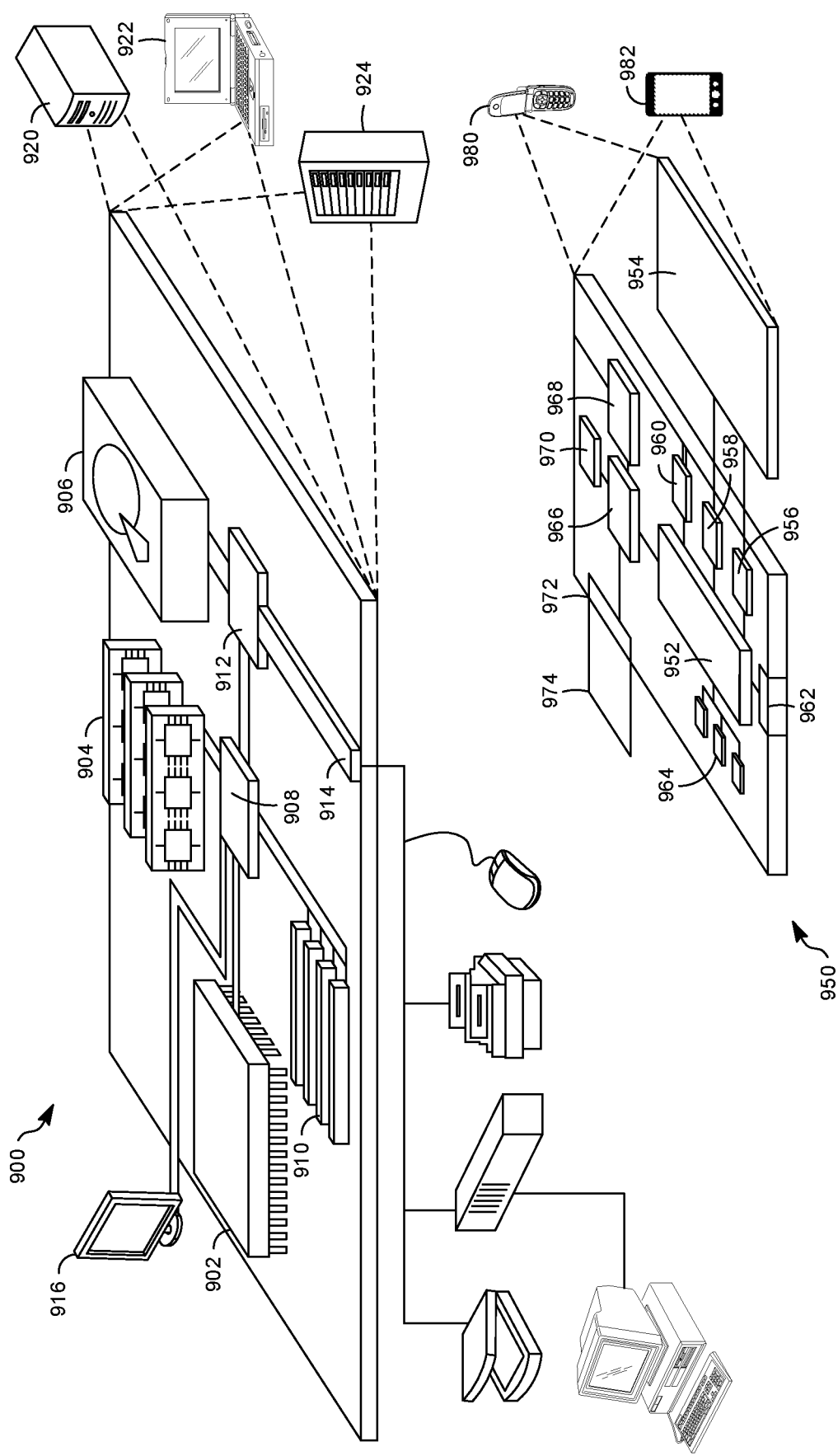
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 754, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   determining that a tab is stale;
   determining a first universal resource locator (URL) associated with the tab;
   determining that content presented by the tab corresponds to an object that is also presented by content associated with a second URL;

determining, based on content associated with at least one of the first URL or the second URL, that a value of an attribute associated with the object has changed from the value of the attribute when the tab presented the object; and outputting a notification that the value of the attribute associated with the object has changed.

2. The method of claim 1, wherein determining that the tab is stale comprises:

determining that the tab has been open on a browser for at least an open threshold time; and determining that the browser has not received input into the tab for at least an input threshold time.

3. The method of claim 2, wherein determining that the tab is stale further comprises determining that the tab has been open on the browser for less than a forgotten threshold time.

4. The method of claim 1, wherein determining that the first URL is associated with the tab comprises sending a request associated with the tab, the request identifying the first URL.

5. The method of claim 1, wherein determining that the content presented by the tab corresponds to the object is based on an image included in the content presented by the tab.

6. The method of claim 1, wherein determining that the content presented by the tab corresponds to the object is based on text included in the content presented by the tab.

7. The method of claim 1, wherein determining that the content presented by the tab corresponds to the object is based on browsing patterns.

8. The method of claim 1, wherein determining that the value of the attribute associated with the object has changed comprises determining changed text associated with the attribute in updated content associated with at least one of the first URL or the second URL.

9. The method of claim 1, wherein determining that the attribute associated with the object has changed comprises determining an updated number associated with the attribute in updated content associated with at least one of the first URL or the second URL.

10. The method of claim 1, wherein the notification includes text identifying the object and indicating the value of the attribute.

11. The method of claim 1, wherein the notification prompts a browser to present visual output indicating that the value of the attribute has changed.

12. The method of claim 1, wherein the notification prompts a browser to present visual output indicating the value of the attribute.

13. The method of claim 1, wherein the outputting the notification is performed periodically.

14. The method of claim 1, wherein the notification is output in response to the determination that the value associated with the attribute has changed.

15. The method of claim 1, further comprising:

determining that the value of the attribute associated with the object has changed by at least a change threshold value, wherein outputting the notification that the value of the attribute associated with the object has changed occurs in response to determining that the attribute associated with the object has changed by at least the change threshold value.

16. The method of claim 1, wherein:

the tab is included on a first browser executing on a first computing device; and the method further includes sending, to a second browser executing on a second computing device, a notification that the value of the attribute associated with the object has changed.

17. A method comprising:

determining that a tab is stale by at least:

determining that the tab has been open for at least an open threshold time; and determining that the tab has not received input for at least an input threshold time;

determining that a value of an attribute associated with an object presented by the tab has changed; and outputting a notification that the value of the attribute associated with the object has changed.

18. A non-transitory computer-readable storage medium comprising instructions stored thereon that, when executed by at least one processor, are configured to cause a server to:

determine that a tab is stale;

determine a first universal resource locator (URL) associated with the tab;

determine that content presented by the tab corresponds to an object that is also presented by content associated with a second URL;

determine, based on content associated with at least one of the first URL or the second URL, that a value of an attribute associated with the object has changed from the value of the attribute when the tab presented the object; and output a notification that the value of the attribute associated with the object has changed.

19. The non-transitory computer-readable storage medium of claim 18, wherein determining that the tab is stale comprises:

determining that the tab has been open for at least an open threshold time; and determining that the tab has not received input for at least an input threshold time.

20. A computing system comprising:

at least one processor; and a non-transitory computer-readable storage medium comprising instructions stored thereon that, when executed by the at least one processor, are configured to cause the computing system to:

determine that a tab is stale;

determine a first universal resource locator (URL) associated with the tab;

determine that content presented by the tab corresponds to an object that is also presented by content associated with a second URL;

determine, based on content associated with at least one of the first URL or the second URL, that a value of an attribute associated with the object has changed from the value of the attribute when the tab presented the object; and output a notification that the value of the attribute associated with the object has changed.

* * * * *